US012361561B2

(12) United States Patent
Xu et al.

(10) Patent No.: US 12,361,561 B2
(45) Date of Patent: Jul. 15, 2025

(54) METHODS AND SYSTEMS FOR MEDICAL IMAGE SEGMENTATION

(71) Applicant: SHANGHAI UNITED IMAGING HEALTHCARE CO., LTD., Shanghai (CN)

(72) Inventors: Lu Xu, Shanghai (CN); Yifeng Wang, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 750 days.

(21) Appl. No.: 17/452,795

(22) Filed: Oct. 29, 2021

(65) Prior Publication Data

US 2022/0138957 A1 May 5, 2022

(30) Foreign Application Priority Data

Oct. 30, 2020 (CN) .......................... 202011197897.3
Dec. 11, 2020 (CN) .......................... 202011437517.9

(51) Int. Cl.
*G06T 7/174* (2017.01)
*G06T 7/11* (2017.01)

(52) U.S. Cl.
CPC ................ *G06T 7/174* (2017.01); *G06T 7/11* (2017.01); *G06T 2207/10016* (2013.01);
(Continued)

(58) Field of Classification Search
CPC . G06T 7/174; G06T 7/11; G06T 2207/10016; G06T 2207/20081;
(Continued)

(56) References Cited

U.S. PATENT DOCUMENTS 10,366,490 B2 * 7/2019 Xu .................... G06V 10/987
11,276,177 B1 * 3/2022 Tsai .................. G06T 7/174
(Continued)

FOREIGN PATENT DOCUMENTS

CN 108389210 A 8/2018
CN 108830326 A 11/2018
(Continued)

OTHER PUBLICATIONS

Amrehn, M.P., Gaube, S., Unberath, M., Schebesch, F., Horz, T., Strumia, M., Steidl, S., Kowarschik, M., & Maier, A.K. (2017). UI-Net: Interactive Artificial Neural Networks for Iterative Image Segmentation Based on a User Model. ArXiv, abs/1709.03450. (Year: 2017).*

(Continued)

*Primary Examiner* — Utpal D Shah
*Assistant Examiner* — Jack Peter Kraynak
(74) *Attorney, Agent, or Firm* — METIS IP LLC

(57) ABSTRACT

A method may include obtaining a first image associated with an image to be segmented, and performing an iteration process for obtaining a target image. The iteration process may include one or more iterations each of which includes: obtaining an image to be modified; obtaining one or more modifications performed on the image to be modified; generating a second image by inputting the image to be segmented, the image to be modified, and the one or more modifications into the image segmentation model; in response to determining that the second image satisfies the first condition, terminating the iteration process by determining the second image as the target image; or in response to determining that the second image does not satisfy the first condition, initiating a new iteration of the iteration process by determining the second image as the image to be modified.

20 Claims, 17 Drawing Sheets

(52) U.S. Cl.
CPC ............... *G06T 2207/20081* (2013.01); *G06T 2207/20084* (2013.01); *G06T 2207/20092* (2013.01); *G06T 2207/30016* (2013.01); *G06T 2207/30241* (2013.01)

(58) Field of Classification Search
CPC . G06T 2207/20084; G06T 2207/20092; G06T 2207/30016; G06T 2207/30241; G06T 7/0012; G06T 7/0014; G06T 7/10
See application file for complete search history.

(56) References Cited

U.S. PATENT DOCUMENTS

| | | | |
|---|---|---|---|
| 2020/0020102 A1* | 1/2020 | Dai | G06N 3/04 |
| 2020/0272841 A1* | 8/2020 | Han | G06T 7/0012 |
| 2020/0311943 A1* | 10/2020 | Dai | G06V 10/945 |
| 2020/0327671 A1* | 10/2020 | Arbel | G06V 10/7753 |
| 2020/0364871 A1* | 11/2020 | Bradski | G06T 11/203 |
| 2021/0150310 A1* | 5/2021 | Wu | G06T 11/60 |
| 2021/0295528 A1* | 9/2021 | Fuchs | G06V 10/751 |
| 2021/0312614 A1* | 10/2021 | Liu | G06N 3/045 |

FOREIGN PATENT DOCUMENTS

| | | | | |
|---|---|---|---|---|
| CN | 109389587 A | | 2/2019 | |
| CN | 109410188 A | | 3/2019 | |
| CN | 109964249 A | * | 7/2019 | ............... A61B 6/00 |
| CN | 111127471 A | * | 5/2020 | ........... G06N 3/0454 |
| CN | 111310793 A | * | 6/2020 | ........... G06F 18/214 |
| CN | 112001925 A | | 11/2020 | |
| WO | 2020215565 A1 | | 10/2020 | |

OTHER PUBLICATIONS

First Office Action in Chinese Application No. 202011197897.3 mailed on Aug. 3, 2022, 19 pages.

Cao, Yuan et al., Self-paced Learning with Diversity for Medical Image Segmentation by Using Query-by-committee, Journal of Northwest University ( Natural Science Edition), 50(2): 285-294, 2020.

Long. J. et al., Fully Convolutional Networks for Semantic Segmentation, Computer Vision Foundation, 2015, 10 pages.

Ronneberger, O. et al., U-Net: Convolutional Networks for Biomedical Image Segmentation, Computer Vision and Pattern Recognition, 2015, 8 pages.

Amrehn, M. et al., UI-Net: Interactive Artificial Neural Networks for Iterative Image Segmentation Based on a User Model, Eurographics Workshop on Visual Computing for Biology and Medicine, 2017, 5 pages.

* cited by examiner

500

```
┌─────────────────────────────────────────────────┐
│ Receiving, from a server, an image to be modified│
│   associated with a image to be segmented        │
│                    510                           │
└─────────────────────────────────────────────────┘
                        ↓
┌─────────────────────────────────────────────────┐
│ Obtaining one or more modifications performed,   │
│ by one or more users, on the image to be modified│
│                    520                           │
└─────────────────────────────────────────────────┘
                        ↓
┌─────────────────────────────────────────────────┐
│    Sending the one or more modifications to      │
│                   the server                     │
│                    530                           │
└─────────────────────────────────────────────────┘
                        ↓
┌─────────────────────────────────────────────────┐
│ Receiving a segmented image from the server, the │
│ segmented image being obtained by inputting the  │
│ image to be segmented, the image to be modified, │
│ and the one or more modifications into an image  │
│              segmentation model                  │
│                    540                           │
└─────────────────────────────────────────────────┘
                        ↓
┌─────────────────────────────────────────────────┐
│ Determining whether the segmented image satisfies│
│                 a first condition                │
│                    550                           │
└─────────────────────────────────────────────────┘
                        ↓
┌─────────────────────────────────────────────────┐
│  Sending a determination on whether the segmented│
│  image satisfies the first condition to the server│
│                    560                           │
└─────────────────────────────────────────────────┘
```

Obtaining an updating sample set
610

Updating one or more parameters of the image segmentation model based on the updating sample set
630

Obtaining an image to be segmented including a target region
911

Obtaining a preliminary segmentation model
912

Generating a processed image by inputting the image to be segmented into the preliminary segmentation model
913

Obtaining a training set including the processed image, a modification trajectory of at least one modification performed on the processed image, and a target image including an identification of the target region
914

Obtaining an image segmentation model by training, based on the training set, the preliminary segmentation model
915

FIG. 9A

METHODS AND SYSTEMS FOR MEDICAL IMAGE SEGMENTATION

CROSS-REFERENCE TO RELATED APPLICATIONS

This application claims priority to Chinese Application No. 202011197897.3, filed on Oct. 30, 2020, and Chinese Application No. 202011437517.9, filed on Dec. 11, 2020, the contents of each of which are incorporated herein by reference to their entirety.

TECHNICAL FIELD

The present disclosure relates to the field of medical image segmentation, and in particular to methods and systems for medical image segmentation based on user interaction.

BACKGROUND

Image segmentation plays an important role in the medical field. An image segmentation model may identify various complex regions in a medical image, so as to provide reliable information for clinical diagnosis and treatment. For some target regions in an image, for example, a target region for radiotherapy, because there is no obvious tissue boundary, the segmentation result obtained only using an image segmentation model may not meet all of the clinical needs. In this case, the professional domain knowledge of the clinician is required for the segmentation of the target regions, so interaction between the doctor and the image segmentation model is needed to improve the final segmentation effect. Therefore, it is desirable to provide methods and systems for image segmentation based on user interaction.

SUMMARY

According to an aspect of the present disclosure, a system for image segmentation may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain a first image associated with an image to be segmented. The one or more processors may perform an iteration process for obtaining a target image. The target image may include an identification of a target region in the image to be segmented. The iteration process may include one or more iterations each of which includes the following operations. The one or more processors may obtain an image to be modified. The image to be modified may include the first image in a first iteration of the one or more iterations of the iteration process, or an image generated by an image segmentation model in a previous iteration. The one or more processors may obtain one or more modifications performed, by one or more users, on the image to be modified. The one or more processors may generate a second image by inputting the image to be segmented, the image to be modified, and the one or more modifications into the image segmentation model. The one or more processors may determine whether the second image satisfies a first condition. In response to determining that the second image satisfies the first condition, the one or more processors may terminate the iteration process by determining the second image as the target image. In response to determining that the second image does not satisfy the first condition, the one or more processors may initiate a new iteration of the iteration process by determining the second image as the image to be modified.

According to another aspect of the present disclosure, a method for image segmentation may include one or more of the following operations. One or more processors may obtain a first image associated with an image to be segmented. The one or more processors may perform an iteration process for obtaining a target image. The target image may include an identification of a target region in the image to be segmented. The iteration process may include one or more iterations each of which includes the following operations. The one or more processors may obtain an image to be modified. The image to be modified may include the first image in a first iteration of the one or more iterations of the iteration process, or an image generated by an image segmentation model in a previous iteration. The one or more processors may obtain one or more modifications performed, by one or more users, on the image to be modified. The one or more processors may generate a second image by inputting the image to be segmented, the image to be modified, and the one or more modifications into the image segmentation model. The one or more processors may determine whether the second image satisfies a first condition. In response to determining that the second image satisfies the first condition, the one or more processors may terminate the iteration process by determining the second image as the target image. In response to determining that the second image does not satisfy the first condition, the one or more processors may initiate a new iteration of the iteration process by determining the second image as the image to be modified.

According to yet another aspect of the present disclosure, a system for image segmentation may include a pre-segmentation module configured to obtain a first image associated with an image to be segmented, and a target image generation module configured to perform an iteration process for obtaining a target image. The target image may include an identification of a target region in the image to be segmented. The iteration process may include one or more iterations each of which includes the following operations. The target image generation module may obtain an image to be modified. The image to be modified may include the first image in a first iteration of the one or more iterations of the iteration process, or an image generated by an image segmentation model in a previous iteration. The target image generation module may obtain one or more modifications performed, by one or more users, on the image to be modified. The target image generation module may generate a second image by inputting the image to be segmented, the image to be modified, and the one or more modifications into the image segmentation model. The target image generation module may determine whether the second image satisfies a first condition. In response to determining that the second image satisfies the first condition, the target image generation module may terminate the iteration process by determining the second image as the target image. In response to determining that the second image does not satisfy the first condition, the target image generation module may initiate a new iteration of the iteration process by determining the second image as the image to be modified.

According to yet another aspect of the present disclosure, a non-transitory computer readable medium may comprise at least one set of instructions. The at least one set of instructions may be executed by one or more processors of a computing device. The one or more processors may obtain a first image associated with an image to be segmented. The one or more processors may perform an iteration process for obtaining a target image. The target image may include an identification of a target region in the image to be segmented. The iteration process may include one or more iterations each of which includes the following operations. The one or more processors may obtain an image to be modified. The image to be modified may include the first image in a first iteration of the one or more iterations of the iteration process, or an image generated by an image segmentation model in a previous iteration. The one or more processors may obtain one or more modifications performed, by one or more users, on the image to be modified. The one or more processors may generate a second image by inputting the image to be segmented, the image to be modified, and the one or more modifications into the image segmentation model. The one or more processors may determine whether the second image satisfies a first condition. In response to determining that the second image satisfies the first condition, the one or more processors may terminate the iteration process by determining the second image as the target image. In response to determining that the second image does not satisfy the first condition, the one or more processors may initiate a new iteration of the iteration process by determining the second image as the image to be modified.

According to an aspect of the present disclosure, a system for image segmentation may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may receive, from a server, an image to be modified associated with an image to be segmented. The one or more processors may obtain one or more modifications performed, by one or more users, on the image to be modified. The one or more processors may send the one or more modifications to the server. The one or more processors may receive a segmented image from the server. The segmented image may be obtained by inputting the image to be segmented, the image to be modified, and the one or more modifications into an image segmentation model. The one or more processors may determine whether the segmented image satisfies a condition. The one or more processors may send the determination associated with whether the segmented image satisfied the condition to the server. The determination may cause the server to perform operations including: in response to determining that the segmented image does not satisfy the condition, initiating, by determining the segmented image as the image to be modified, a new iteration of an iteration process for determining a target image associated with the image to be segmented; or in response to determining that the segmented image satisfies the condition, terminating the iteration process by determining the segmented image as the target image.

According to another aspect of the present disclosure, a method for image segmentation may include one or more of the following operations. One or more processors may receive, from a server, an image to be modified associated with an image to be segmented. The one or more processors may obtain one or more modifications performed, by one or more users, on the image to be modified. The one or more processors may send the one or more modifications to the server. The one or more processors may receive a segmented image from the server. The segmented image may be obtained by inputting the image to be segmented, the image to be modified, and the one or more modifications into an image segmentation model. The one or more processors may determine whether the segmented image satisfies a condition. The one or more processors may send the determination associated with whether the segmented image satisfied the condition to the server. The determination may cause the server to perform operations including: in response to determining that the segmented image does not satisfy the condition, initiating, by determining the segmented image as the image to be modified, a new iteration of an iteration process for determining a target image associated with the image to be segmented; or in response to determining that the segmented image satisfies the condition, terminating the iteration process by determining the segmented image as the target image.

According to yet another aspect of the present disclosure, a system for image segmentation may include an image receiving module and an iteration module. The image receiving module may be configured to receive, from a server, an image to be modified associated with an image to be segmented. The iteration module may be configured to obtain one or more modifications performed, by one or more users, on the image to be modified. The iteration module may be configured to send the one or more modifications to the server. The iteration module may be configured to receive a segmented image from the server. The segmented image may be obtained by inputting the image to be segmented, the image to be modified, and the one or more modifications into an image segmentation model. The iteration module may be configured to determine whether the segmented image satisfies a condition. The iteration module may be configured to send the determination associated with whether the segmented image satisfied the condition to the server. The determination may cause the server to perform operations including: in response to determining that the segmented image does not satisfy the condition, initiating, by determining the segmented image as the image to be modified, a new iteration of an iteration process for determining a target image associated with the image to be segmented; or in response to determining that the segmented image satisfies the condition, terminating the iteration process by determining the segmented image as the target image.

According to yet another aspect of the present disclosure, a non-transitory computer readable medium may comprise at least one set of instructions. The at least one set of instructions may be executed by one or more processors of a computing device. The one or more processors may receive, from a server, an image to be modified associated with an image to be segmented. The one or more processors may obtain one or more modifications performed, by one or more users, on the image to be modified. The one or more processors may send the one or more modifications to the server. The one or more processors may receive a segmented image from the server. The segmented image may be obtained by inputting the image to be segmented, the image to be modified, and the one or more modifications into an image segmentation model. The one or more processors may determine whether the segmented image satisfies a condition. The one or more processors may send the determination associated with whether the segmented image satisfied the condition to the server. The determination may cause the server to perform operations including: in response to determining that the segmented image does not satisfy the condition, initiating, by determining the segmented image as the image to be modified, a new iteration of an iteration process for determining a target image associated with the image to be segmented; or in response to determining that the segmented image satisfies the condition, terminating the iteration process by determining the segmented image as the target image.

In some embodiments, to obtaining the first image associated with the image to be segmented, the one or more processors may obtain the image to be segmented. The one or more processors may generate a third image by segmenting the image to be segmented. The one or more processors may determine whether the third image satisfies a second condition. In response to determining that the third image satisfies the second condition, the one or more processors may determine the third image as the target image. In response to determining that the third image does not satisfy the second condition, the one or more processors may determine the third image as the first image.

In some embodiments, to determine whether the second image satisfies the first condition, the one or more processors may send the second image to a terminal. The one or more processors may receive, from the terminal, a determination associated with whether the second image satisfies the first condition.

In some embodiments, to obtain the one or more modifications performed, by the one or more users, on the image to be modified, the one or more processors may send the image to be modified to a terminal. The one or more processors may receive, from the terminal, the one or more modifications performed, by the one or more users, on the image to be modified.

In some embodiments, the one or more processors may update the image segmentation model based on the target image.

In some embodiments, to update the image segmentation model based on the target image, the one or more processors may obtain an updating sample set including the image to be segmented, the first image, and the target image. The one or more processors may update one or more parameters of the image segmentation model based on the updating sample set.

In some embodiments, the updating sample set may include at least one modification performed on the image to be modified in the iteration process.

In some embodiments, the one or more parameters of the image segmentation model may indicate an image modification characteristic of the one or more users.

In some embodiments, to update the image segmentation model based on the target image, the one or more processors may obtain a modification trajectory of at least one modification performed on at least one image to be modified in the iteration process. The one or more processors may obtain a training set including the modification trajectory, the at least one image to be modified, and the target image. The one or more processors may update the image segmentation model based on the training set.

In some embodiments, the modification trajectory includes at least one of a location of the at least one modification on the image to be modified, a type of the at least one modification, or a modification time of the at least one modification.

In some embodiments, the modification trajectory may include a record of a modification process of performing the at least one modification on the image to be modified.

In some embodiments, to obtain the modification trajectory of the at least one modification performed on the image to be modified in the iteration process, the one or more processors may obtain video data generated by recording the modification process of the at least one modification that is performed, through a display device, on the image to be modified. The one or more processors may obtain the modification trajectory of the at least one modification based on the video data.

In some embodiments, to obtain the modification trajectory of the at least one modification performed on the image to be modified in the iteration process, the one or more processors may obtain one or more input instructions configured to perform the at least one modification on the image to be modified. The one or more processors may obtain the modification trajectory of the at least one modification based on the one or more input instructions.

In some embodiments, to update the image segmentation model based on the training set, the one or more processors may generate an intermediate image by inputting the at least one image to be modified and the modification trajectory into the image segmentation model. The one or more processors may determine a loss function based on the intermediate image and the target image. The one or more processors may update the image segmentation model based on the loss function.

In some embodiments, to determine the loss function based on the intermediate image and the target image, the one or more processors may obtain a segmentation probability of each of a plurality of first image blocks of the intermediate image. The segmentation probability may indicate a probability that the first image block belongs to the target region. The one or more processors may obtain a segmentation type of each of a plurality of second image blocks of the target image. The segmentation type may indicate whether the second image block belongs to the target region. The one or more processors may determine the loss function based on the segmentation probabilities and the segmentation type.

In some embodiments, the image segmentation model may include an organ identification model.

According to an aspect of the present disclosure, a system for training an image segmentation model may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain an image to be segmented. The one or more processors may obtain a preliminary segmentation model. The one or more processors may generate a processed image by inputting the image to be segmented into the preliminary segmentation model. The one or more processors may obtain a training set including the processed image, a modification trajectory of at least one modification performed on the processed image, and a target image including an identification of a target region in the image to be segmented. The one or more processors may obtain an image segmentation model by training, based on the training set, the preliminary segmentation model.

According to another aspect of the present disclosure, a method for training an image segmentation model may include one or more of the following operations. One or more processors may obtain an image to be segmented. The one or more processors may obtain a preliminary segmentation model. The one or more processors may generate a processed image by inputting the image to be segmented into the preliminary segmentation model. The one or more processors may obtain a training set including the processed image, a modification trajectory of at least one modification performed on the processed image, and a target image including an identification of a target region in the image to be segmented. The one or more processors may obtain an image segmentation model by training, based on the training set, the preliminary segmentation model.

According to yet another aspect of the present disclosure, a system for training an image segmentation model may include an image obtaining module configured to obtain an image to be segmented, obtain a preliminary segmentation model, and generate a processed image by inputting the image to be segmented into the preliminary segmentation model. The system may also include a training set obtaining module configured to obtain a training set including the processed image, a modification trajectory of at least one modification performed on the processed image, and a target image including an identification of a target region in the image to be segmented. The system may also include a training module configured to obtain an image segmentation model by training, based on the training set, the preliminary segmentation model.

According to yet another aspect of the present disclosure, a non-transitory computer readable medium may comprise at least one set of instructions. The at least one set of instructions may be executed by one or more processors of a computing device. The one or more processors may obtain an image to be segmented. The one or more processors may obtain a preliminary segmentation model. The one or more processors may generate a processed image by inputting the image to be segmented into the preliminary segmentation model. The one or more processors may obtain a training set including the processed image, a modification trajectory of at least one modification performed on the processed image, and a target image including an identification of a target region in the image to be segmented. The one or more processors may obtain an image segmentation model by training, based on the training set, the preliminary segmentation model.

In some embodiments, the modification trajectory may include at least one of a location of the at least one modification on the processed image, a type of the at least one modification, or a modification time of the at least one modification.

In some embodiments, the modification trajectory may include a record of a modification process of performing the at least one modification on the processed image.

In some embodiments, the modification trajectory of the at least one modification may be obtained by performing operations including: obtaining video data generated by recording the modification process of the at least one modification that is performed, through a display device, on the processed image; and obtaining the modification trajectory of the at least one modification based on the video data.

In some embodiments, the modification trajectory of the at least one modification may be obtained by performing operations including: obtaining one or more input instructions configured to perform the at least one modification on the processed image; and obtaining the modification trajectory of the at least one modification based on the one or more input instructions.

In some embodiments, to obtaining the image segmentation model by training the preliminary segmentation model based on the training set, the one or more processors may perform an iteration process for obtaining the image segmentation model. The iteration process may include one or more iterations each of which includes the following operations. The one or more processors may obtain an image to be modified, the image to be modified including the processed image in a first iteration of the one or more iterations of the iteration process, or an image generated in a previous iteration. The one or more processors may obtain a modification trajectory of at least one modification performed on the image to be modified. The one or more processors may generate an intermediate image by inputting the image to be modified and the modification trajectory corresponding to the image to be modified into an intermediate model. The intermediate model may be the preliminary segmentation model in the first iteration, or an updated model generated in the previous iteration. The one or more processors may determine a loss function based on the intermediate image and the target image. The one or more processors may update the intermediate model based on the loss function. The one or more processors may determine whether a terminal condition is satisfied. In response to determining that the terminal condition is satisfied, the one or more processors may terminate the iteration process by determining the updated model as the image segmentation model. In response to determining that the terminal condition is not satisfied, the one or more processors may initiate a new iteration of the iteration process by determining the intermediate image as the image to be modified.

In some embodiments, to determining a loss function based on the intermediate image and the target image, the one or more processors may obtain a segmentation probability of each of a plurality of first image blocks of the intermediate image, the segmentation probability indicating a probability that the first image block belongs to the target region. The one or more processors may obtain a segmentation type of each of a plurality of second image blocks of the target image, the segmentation type indicating whether the second image block belongs to the target region. The one or more processors may determine the loss function based on the segmentation probabilities and the segmentation type.

In some embodiments, the image segmentation model includes an organ identification model.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary image segmentation process according to some embodiments of the present disclosure;

FIG. 6 is a flowchart illustrating an exemplary process for updating an image segmentation model based on a target image according to some embodiments of the present disclosure;

FIG. 9A is a flowchart illustrating an exemplary process for obtaining an image segmentation model according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Figure 2:
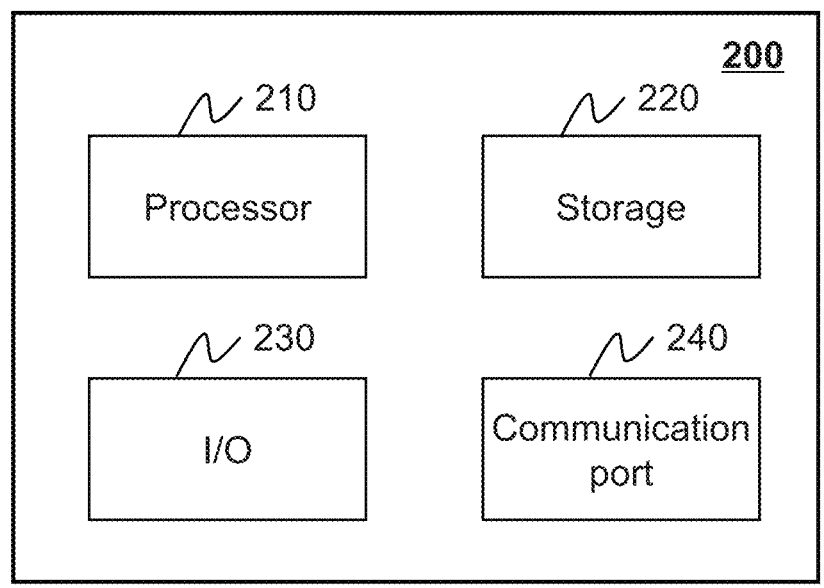
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., the processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

It should be noted that, in the present disclosure, an image, or a portion thereof (e.g., a region in the image) corresponding to an object (e.g., tissue, an organ, a tumor, etc.) may be referred to as an image, or a portion of thereof (e.g., a region) of or including the object, or the object itself. For instance, a region in an image that corresponds to or represents a breast may be referred to as that the region includes a breast. As another example, an image of or including a breast may be referred to a breast image, or simply breast for brevity. For brevity, that a portion of an image corresponding to or representing an object is processed (e.g., extracted, segmented, etc.) may be described as the object is processed. For instance, that a portion of an image corresponding to a breast is segmented from the rest of the image may be described as that the breast is segmented from the image.

An aspect of the present disclosure relates to systems and methods for segmenting an image using an image segmentation model based on user interaction. A first image associated with an image to be segmented may be obtained. An iteration process for obtaining a target image may be obtained. The target image may include an identification of a target region in the image to be segmented. In each iteration, one or more modifications performed, by one or more users, on an image to be modified may be obtained. A second image may be obtained by inputting the image to be segmented, the image to be modified, and the one or more modifications into an image segmentation model. If the second image satisfies a user's requirement, the iteration process may be terminated by determining the second image as the target image. If the second image does not satisfy the user's requirement, a new iteration of the iteration process may be initiated by determining the second image as the image to be modified of the new iteration. After the target image is generated, the image segmentation model may be updated using the target image and the one or more modifications in at least one iteration of the iteration process.

The target image may be used to update the image segmentation model, so that the updating of the image segmentation model does not need to rely on a large number of training samples, and the image segmentation model does not need to be updated separately, thereby improving the updating efficiency. The image segmentation model can learn the segmentation operation of one or more specific user based on multiple user interactions, thereby obtaining an image segmentation model in conformity with the user's segmentation habits, so that the output target image can satisfy the user's requirement, which can improve the adaptability of the image segmentation model. The modification in the iteration process can be selected as the training sample, and the modification of an incorrect operation can be excluded, so as to avoid the influence of the training sample of the incorrect operation on the update of the image segmentation model. The image to be segmented may be roughly segmented based on a pre-segmentation model, on one hand, a target image corresponding to a simple image to be segmented can be directly obtained, and on the other hand, the subsequent iterative process can converge faster, which can improve the efficiency of the image segmentation model.

Another aspect of the present disclosure relates to systems and methods for training an image segmentation model based on user interaction. An image to be segmented and a preliminary segmentation model may be obtained. A processed image may be obtained by inputting the image to be segmented into the preliminary segmentation model. A training set including the processed image, a modification trajectory of at least one modification performed on the processed image, and a target image including an identification of a target region in the image to be segmented may be obtained. An image segmentation model may be obtained by training, based on the training set, the preliminary segmentation model.

The modification trajectory is used as training data to make the image segmentation model learn modification intention of a user in the process of modification, improving accuracy and flexibility of the image segmentation model. According to the modification of the user, the image segmentation model obtained by repeated iterative training may adapt to image segmentation habits of different users, making the image segmentation model have a good adaptability. The modification trajectory of the process of modification is obtained through screen recording, making it easy to process error information and unnecessary information in the modification trajectory.

Figure 1A:
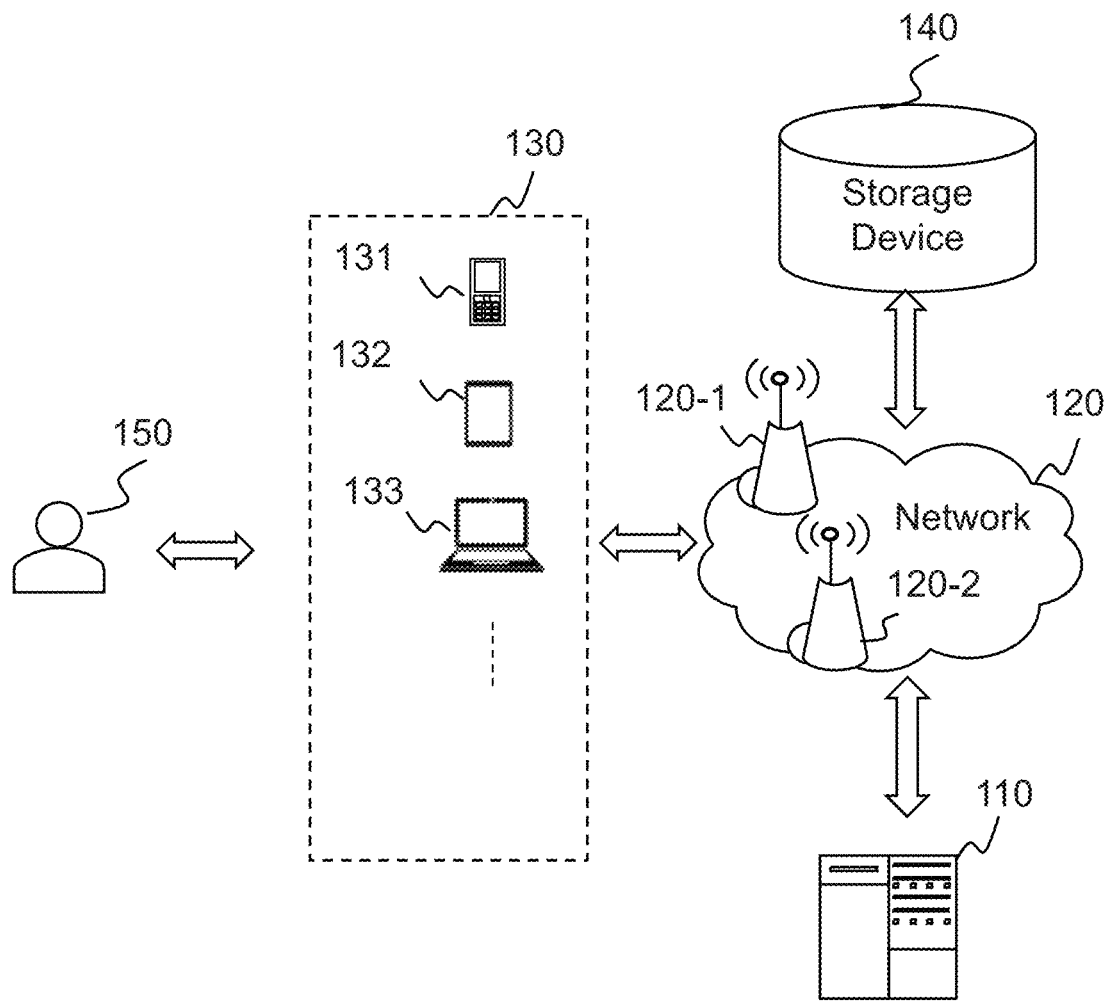
FIG. 1A is a schematic diagram illustrating an exemplary image segmentation system according to some embodiments of the present disclosure.

FIG. 1A is a schematic diagram illustrating an exemplary image segmentation system 100 according to some embodiments of the present disclosure. As illustrated, the image segmentation system 100 may include a processing device 110, a network 120, a terminal 130, and a storage device 140. The components of the image segmentation system 100 may be connected in one or more of various ways. Mere by way of example, as illustrated in FIG. 1A, the processing device 110 may be connected to the storage device 140 directly or through the network 120. As another example, the processing device 110 may be connected to the terminal 130 directly or through the network 120. As still a further example, the terminal 130 may be connected to the storage device 140 directly or through the network 120.

The processing device 110 may process data and/or information obtained from the terminal 130 and/or the storage device 140. For example, the processing device 110 may obtain, from the storage device 140, an image to be segmented. As another example, the processing device 110 may send, to the terminal 130, an image to be modified. As still another example, the processing device 110 may obtain, from the terminal 130, one or more modifications of the image to be modified. In some embodiments, the processing device 110 may be a single server, or a server group. The server group may be centralized or distributed. In some embodiments, the processing device 110 may be local or remote. For example, the processing device 110 may access information and/or data from the terminal 130 and/or the storage device 140 via the network 120. As another example, the processing device 110 may be directly connected to the terminal 130 and/or the storage device 140 to access stored or acquired information and/or data. In some embodiments, the processing device 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 110 may be implemented on a computing device 200 having one or more components illustrated in FIG. 3 in the present disclosure.

The network 120 may include any suitable network that can facilitate the exchange of information and/or data for the image segmentation system 100. In some embodiments, one or more components of the image segmentation system 100

(e.g., the terminal 130, the processing device 110, or the storage device 140) may communicate information and/or data with one or more other components of the image segmentation system 100 via the network 120. For example, the processing device 110 may obtain one or more modifications from the terminal 130 via the network 120. In some embodiments, the network 120 may be any type of wired or wireless network, or a combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points (e.g., 120-1, 120-2, etc.) through which one or more components of the image segmentation system 100 may be connected to the network 120 to exchange data and/or information.

The terminal 130 include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, smart footgear, a pair of smart glasses, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a Hololens, a Gear VR, etc. In some embodiments, the terminal 130 may remotely operate the processing device 110. In some embodiments, the terminal 130 may operate the processing device 110 via a wireless connection. In some embodiments, the terminal 130 may receive information and/or instructions inputted by a user, and send the received information and/or instructions to the processing device 110 via the network 120. In some embodiments, the terminal 130 may receive data and/or information from the processing device 110. In some embodiments, the terminal 130 may be part of the processing device 110. In some embodiments, the terminal 130 may be omitted.

In some embodiments, a user 150 may input an instruction into the terminal 130. For example, the terminal 130 may display an image. The user 150 may modify the displayed image through the terminal 130.

In some embodiments, the processing device 110 and the terminal 130 may be implemented on a single device, e.g., a smartphone, a laptop, a desktop, a tablet computer, etc.

The storage device 140 may store data and/or instructions. In some embodiments, the storage device 140 may store data obtained from the terminal 130 and/or the processing device 110. For example, the storage device 140 may store a designed time-domain waveform designed by a user (e.g., a doctor, an imaging technician). In some embodiments, the storage device 140 may store data and/or instructions that the processing device 110 may execute or use to perform exemplary methods described in the present disclosure. For example, the storage device 140 may store instructions that the processing device 110 may execute to perform image segmentation. In some embodiments, the storage device 140 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 120 to communicate with one or more components of the image segmentation system 100 (e.g., the processing device 110, the terminal 130, etc.). One or more components of the image segmentation system 100 may access the data or instructions stored in the storage device 140 via the network 120. In some embodiments, the storage device 140 may be directly connected to or communicate with one or more components of the image segmentation system 100 (e.g., the processing device 110, the terminal 130, etc.). In some embodiments, the storage device 140 may be part of the processing device 110.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 1B:
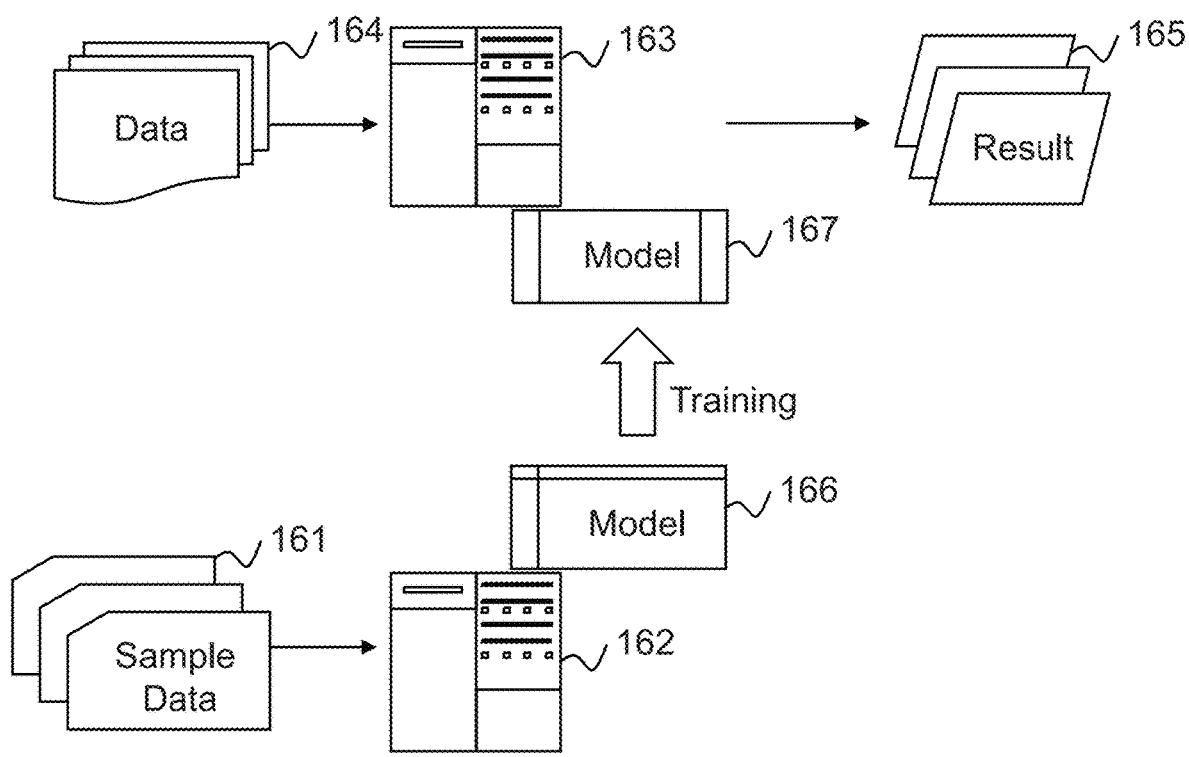
FIG. 1B is a schematic diagram illustrating a system for using and/or training a model according to some embodiments of the present disclosure.

FIG. 1B is a schematic diagram illustrating a system 160 for using and/or training a model according to some embodiments of the present disclosure.

As shown in FIG. 1B, the system 160 may include a first computing system 162 and a second computing system 163. In some embodiments, the first computing system 162 and the second computing system 163 may be the same or different. The first computing system 162 and the second computing system 163 may be the same computing system or different computing systems.

The first computing system 162 and the second computing system 163 may refer to systems with computing ability, which may include various computers, such as servers or personal computers, or a computing platform composed of a plurality of computers connected in various structures.

In some embodiments, the first computing system 162 and/or the second computing system 163 may include one or more processors that may execute program instructions. The one or more processors may include various central processing units (CPUs), Graphics Processing Units (GPUs), application-specific integrated circuits (ASICs), or other types of integrated circuits.

In some embodiments, the first computing system 162 and/or the second computing system 163 may include one or more display devices. The one or more display devices may display an image (e.g., an image to be modified illustrated in FIGS. 4-15). A user (e.g., a doctor, a technician, an engineer, etc.) may perform, on the image through the one or more display devices, one or more modifications related to identifying a target region in the image. A modification trajectory of the one or more modifications may be obtained through one or more display devices. The one or more display devices may include various devices with screen for displaying, and the one or more display devices may have functions for receiving and/or transmitting information, such as computers, mobile phones, tablets, or the like.

In some embodiments, the first computing system 162 and/or the second computing system 163 may include a storage device, which may store instructions or data. The storage device may include mass memory, removable memories, volatile read-write memories, read-only memories (ROMs), or the like, or any combination thereof.

In some embodiments, the first computing system 162 and/or the second computing system 163 may include a network for internal communication or external communication. The network may be any one or more of wired or wireless network.

In some embodiments, the first computing system 162 may be configured to generate and/or update a model by performing a training process. The first computing system 162 may obtain sample data 161, and the sample data 161 may be data for training and/or updating a model. For example, the sample data 161 may be data used to train or update an image segmentation model. As another example, the sample data 161 may include a first image, a second image, an image to be segmented, an image to be modified, a target image, one or more modifications, a modification trajectory, a processed image, an intermediate image illustrated in FIGS. 4-15, or the like, or any combination thereof. The sample data 161 may be input into the first computing system 162 in various common ways.

A model 166 may be trained and/or updated in the first computing system 162 using the sample data 161. One or more parameters of the model 166 may be updated, and a trained or updated model 167 may be obtained. For example, the model 166 may be a preliminary segmentation model illustrated in FIG. 9A or an image segmentation model to be updated illustrated in FIG. 4.

In some embodiments, the second computing system 163 may be configured to generate a result 165 by processing data 164 using the model 167. The second computing system 163 may obtain the data 164, and the data 164 may include an image to be segmented. The data 164 may be input into the second computing system 163 in various common ways.

The second computing system 163 may obtain the model 167. The second computing system 163 may generate the result 165 based on the model 167, and the result 165 may include a segmentation result of the data 164 by the model 167. For example, the model 167 may be an image segmentation model illustrated in FIG. 4, and the result 165 may include a segmentation result (e.g., a target image illustrated in FIG. 4) of an image to be segmented.

A model (e.g., the model 166 and/or the model 167) may refer to a collection of one or more operations based on a processing device. The one or more operations may include a large number of parameters. When executing the model, the parameters may be preset or dynamically adjusted. Some parameters may be obtained through training, and some parameters may be obtained during process of execution. Detailed description of the model involved in the present disclosure may be referred to relevant parts of the present disclosure.

In some embodiments, the second computing system 163 may be implemented on the image segmentation system 100, e.g., the processing device 110 or the terminal 130. In some embodiments, the first computing system 163 may be implemented on the image segmentation system 100, e.g., the processing device 110 or the terminal 130, or implemented on an external device communication with the image segmentation system 100.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 2 is a schematic diagram illustrating exemplary hardware and/or software components of a computing device on which the processing device 110 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (program code) and perform functions of the processing device 110 in accordance with techniques described herein. The computer instructions may include routines, programs, objects, components, signals, data structures, procedures, modules, and functions, which perform particular functions described herein. In some embodiments, the processor 210 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be noted that the computing device 200 in the present disclosure may also include multiple processors, and thus operations of a method that are performed by one processor as described in the present disclosure may also be jointly or separately performed by the multiple processors. For example, if in the present disclosure the processor of the computing device 200 executes both operations A and B, it should be understood that operations A and step B may also be performed by two different processors jointly or separately in the computing device 200 (e.g., a first processor executes operation A and a second processor executes operation B, or the first and second processors jointly execute operations A and B).

The storage 220 may store data/information obtained from the terminal 130, the storage device 140, or any other component of the image segmentation system 100. In some embodiments, the storage 220 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input or output signals, data, or information. In some embodiments, the I/O 230 may enable user interaction with the processing device 110. In some embodiments, the I/O 230 may include an input device and an output device. Exemplary input devices may include a keyboard, a mouse, a touch screen, a microphone, a trackball, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing device 140 and the terminal 130, or the storage device 140. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
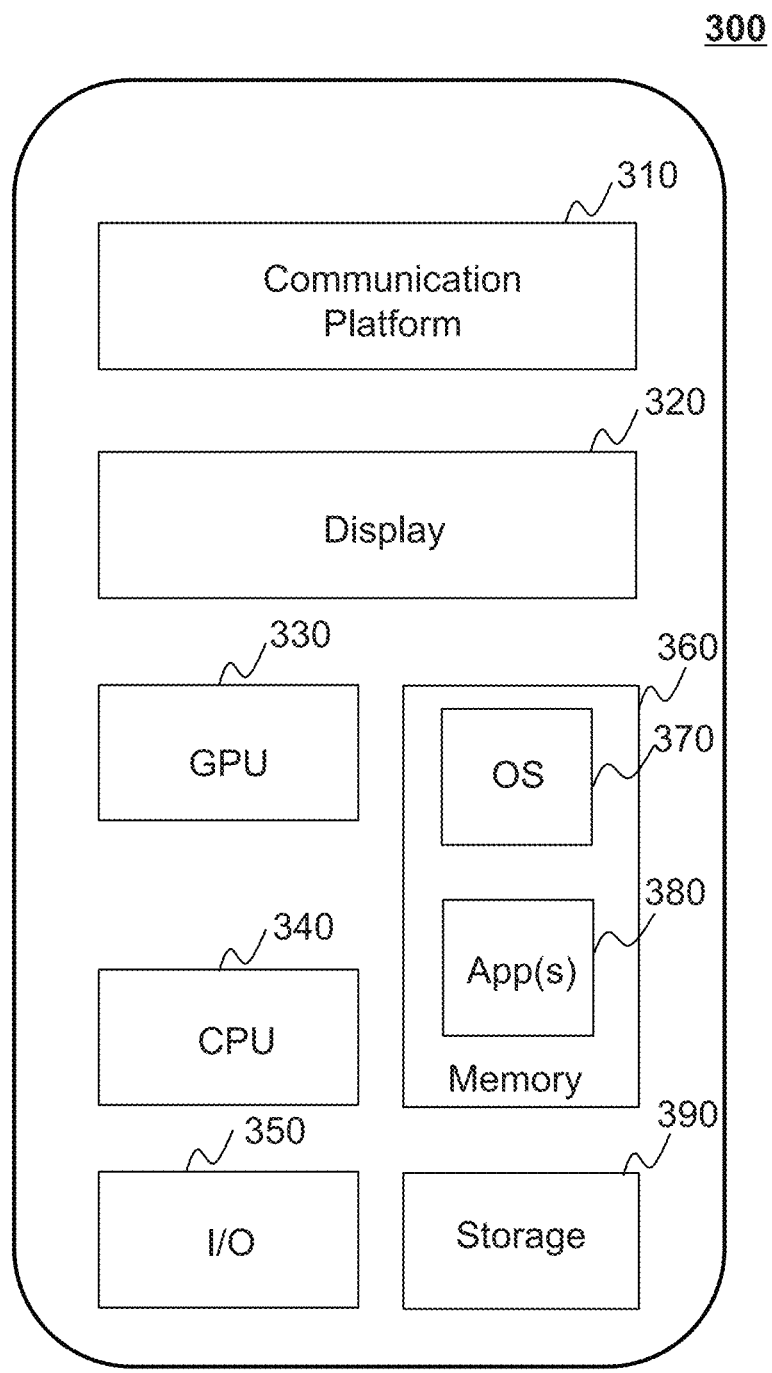
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 110. User interactions with the information stream may be achieved via the I/O 350 and provided to the processing device 130 and/or other components of the image segmentation system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the blood pressure monitoring as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

An image segmentation model can distinguish various complexly distributed regions in a medical image, so as to provide reliable information for clinical diagnosis and treatment. However, in the process of separately training an image segmentation model, a large number of training samples and gold standards are required. Especially for a delineation of a radiotherapy target region (including a general target region, a clinical target region, and a planned target region), there is no obvious tissue boundary of the radiotherapy target region, and professional domain knowledge is required. Usually, delineation for one time cannot satisfy all the doctor's clinical requirements, and interaction with the doctor is needed to improve the final segmentation effect. Regarding the radiotherapy target region, although each hospital delineates the target region based on certain consensus and guidelines, there will be different habits in clinical operations, so it is necessary to collect, for different hospitals, data with gold standards. The count of training sample sets collected in this way is bound to be limited. Therefore, it is necessary to continuously input the newly obtained data into the model during the user's use for continuous optimization, increase the training sample sets, and reduce the count of doctor interactions.

Therefore, it is desirable to provide medical image segmentation methods, systems, and devices based on user interaction.

Figure 4:
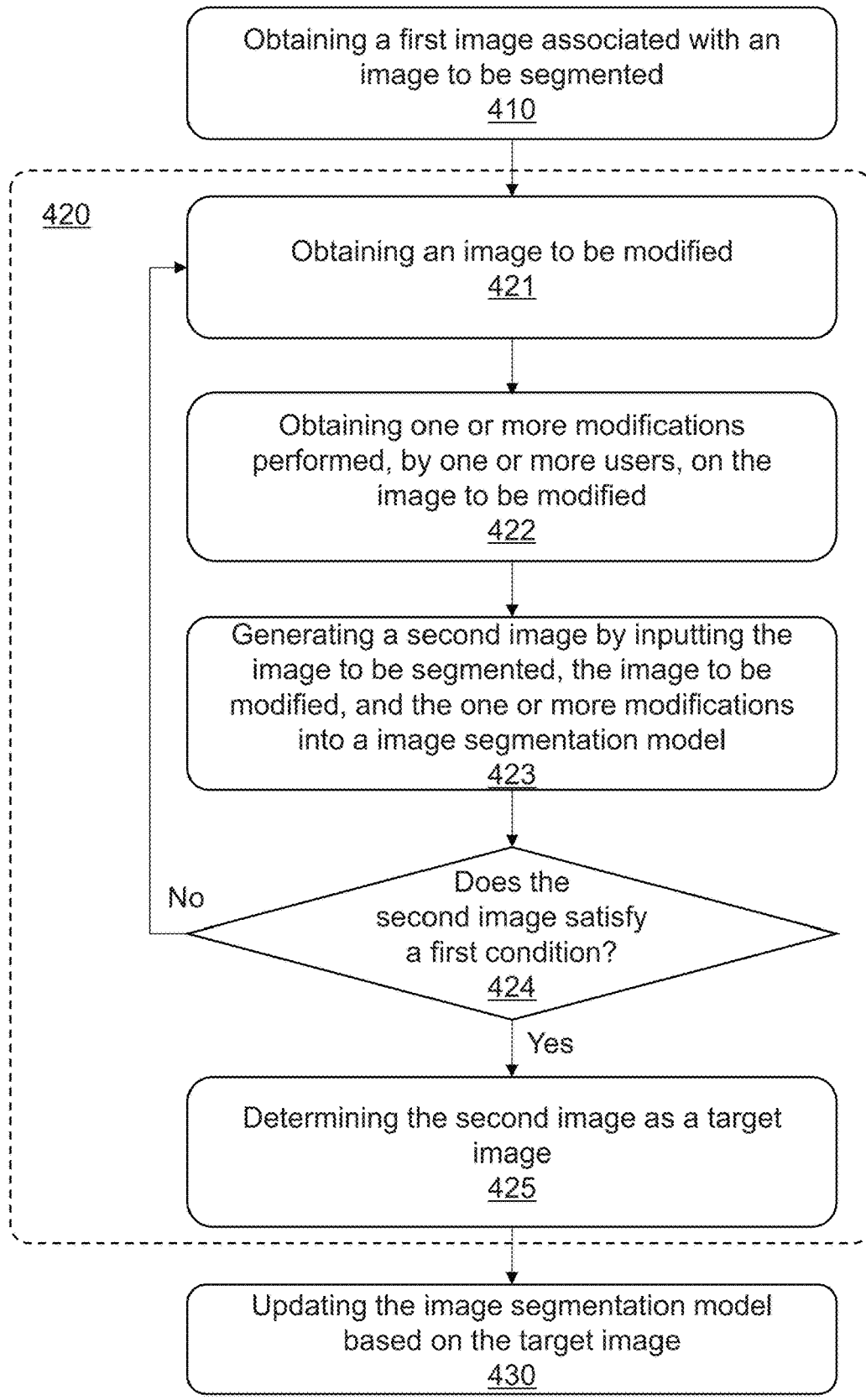
FIG. 4 is a flowchart illustrating an exemplary image segmentation process according to some embodiments of the present disclosure.

FIG. 4 is a flowchart illustrating an exemplary image segmentation process 400 according to some embodiments of the present disclosure. In some embodiments, the process 400 may be implemented in the image segmentation system 100 illustrated in FIG. 1A. For example, the process 400 may be stored in a storage medium (e.g., the storage device 140, the storage 220, the storage 390, the memory 360, etc.) as a form of instructions, and can be invoked and/or executed by the processing device 110 (e.g., the processor 210 of the processing device 110, or one or more modules in the processing device 110 illustrated in FIG. 12) and/or the terminal 130 (e.g., the CPU 340, the GPU 330, or one or more modules illustrated in FIG. 13). The operations of the illustrated process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting. In some embodiments, the process 400 may be implemented in the second computing system 163 illustrated in FIG. 1B.

In 410, the processing device 110 (e.g., a pre-segmenting module 1210 in FIG. 12) may obtain a first image associated with an image to be segmented.

In some embodiments, a medical image refers to an image of an internal tissue or an appearance of a target object for medical treatment or medical research. In the present disclosure, "subject" and "object" are used interchangeably. Mere by way of example, the target object may include a patient, a man-made object, etc. As another example, the object may include a specific portion, organ, and/or tissue of a patient. For example, the target object may include head, brain, neck, body, shoulder, arm, thorax, cardiac, stomach, blood vessel, soft tissue, knee, feet, or the like, or any combination thereof.

An image to be segmented refers to a medical image in which a target region needs to be segmented or identified. The segmentation process is to distinguish the target region and a background region in the image to be segmented.

The background region of the image to be segmented refers to a region other than the target region in the image to be segmented. For example, if an image to be segmented is an image of a patient's brain, the target region may include one or more diseased tissues in the image of the patient's brain, and the background region may be a region other than the one or more diseased tissues in the image of the patient's brain.

It can be understood that there is a boundary between the target region and the background region in the image to be segmented. In the present disclosure, a segmentation process of the image to be segmented to obtain a target image may refer to a process for identifying the target region. A segmentation result of the image to be segmented may be represented by delineating the boundary between the target region and the background region in the image to be segmented.

In some embodiments, the image to be segmented may include an X-ray image, a computed tomography (CT) image, a positron emission tomography (PET) image, a single-photon emission computed tomography (SPECT) image, a magnetic resonance (MR) image, an ultrasound scanning image, a digital subtraction angiography (DSA) image, a magnetic resonance angiography (MRA) image, a time of flight magnetic resonance image (TOF-MRI), a magnetoencephalography (MEG) image, or the like, or any combination thereof.

In some embodiments, a format of the image to be segmented may include a joint photographic experts group (JPEG), a tagged image file format (TIFF), a graphics interchange format (GIF), a kodak flash pix (FPX) image format, a digital imaging and communications in medicine (DICOM) image format, etc.

In some embodiments, the image to be segmented may be a two-dimensional (2D) image, a three-dimensional (3D) image, or a four-dimensional (4D) image. In some embodiments, a three-dimensional image may include a series of two-dimensional image slices or two-dimensional image layers. In some embodiments, a four-dimensional image may include a series of three-dimensional temporal frames.

Figure 8A:
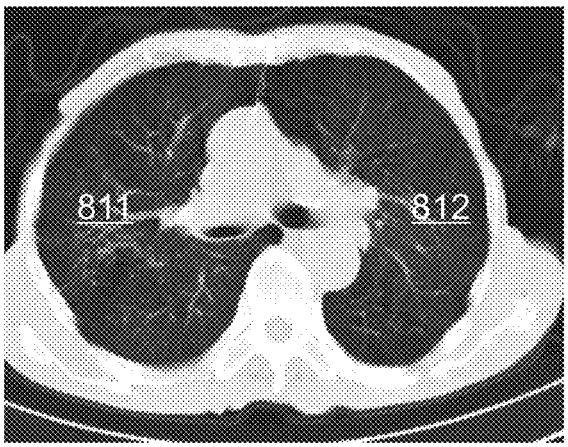
FIG. 8a is a schematic diagram illustrating an exemplary image to be segmented according to some embodiments of the present disclosure.

Merely by way of example, FIG. 8a is a schematic diagram illustrating an exemplary image 810 to be segmented according to some embodiments of the present disclosure. As shown in FIG. 8a, the image 810 to be segmented may include a target region that includes a first portion 811 and a second portion 812.

In some embodiments, the processing device 110 may generate a third image by segmenting the image to be segmented. The processing device 110 may determine whether the third image satisfies a second condition. In response to determining that the third image satisfies the second condition, the processing device 110 may determine the third image as a target image. In response to determining that the third image does not satisfy the second condition, the processing device 110 may determine the third image as the first image.

The third image refers to a medical image obtained after a pre-segmentation processing is performed on the image to be segmented. It can be understood that the boundary between the target region and the background region in the third image may be preliminarily identified by a pre-segmentation model. The type and format of the third image may be similar to the image to be segmented, which will not be repeated here. In some embodiments, the third image may be regarded as the image to be segmented with preliminarily identification of the target region.

In some embodiments, the third image may be the image to be segmented with a preliminary identification of the target region.

In some embodiments, the pre-segmentation processing of the image to be segmented may be performed by a pre-segmentation model. The image to be segmented may be input into the pre-segmentation model, and the pre-segmentation model may output the third image.

The pre-segmentation model refers to a model for pre-segmenting the image to be segmented. In some embodiments, the pre-segmentation model may be a pre-trained model.

In some embodiments, the pre-segmentation model may include a traditional segmentation model. Exemplary traditional segmentation models may include a threshold model, a region growing model, an edge detection model, or the like, or any combination thereof.

In some embodiments, the pre-segmentation model may include an image segmentation model combined with specific tools. Exemplary image segmentation models combined with specific tools may include a genetic algorithm, a wavelet analysis, a wavelet transform, an active contour model, or the like, or any combination thereof.

In some embodiments, the pre-segmentation model may include a neural network model. In some embodiments, the pre-segmentation model may include a convolutional neural networks (CCN) model, a long short-term memory (LSTM) model, a bi-directional long short-term memory (Bi-LSTM) model, or the like, or any combination thereof.

In some embodiments, the pre-segmentation of the image to be segmented may include manual segmentation or other methods, which is not limited in the present disclosure.

It can be understood that pre-segmentation only performs rough segmentation processing on the image to be segmented. When the target region and background region in the image to be segmented are simple in distribution and clear in outline, the third image output by the pre-segmentation model may satisfy the segmentation requirements. When the target region and the background region in the image to be segmented are complex in distribution and blurred in outline, further segmentation processing on the third image may be required based on user interaction. User interaction refers to a user's (e.g., a doctor, a technician, an engineer, etc.) participation in further segmentation processing on the third image.

Figure 7:
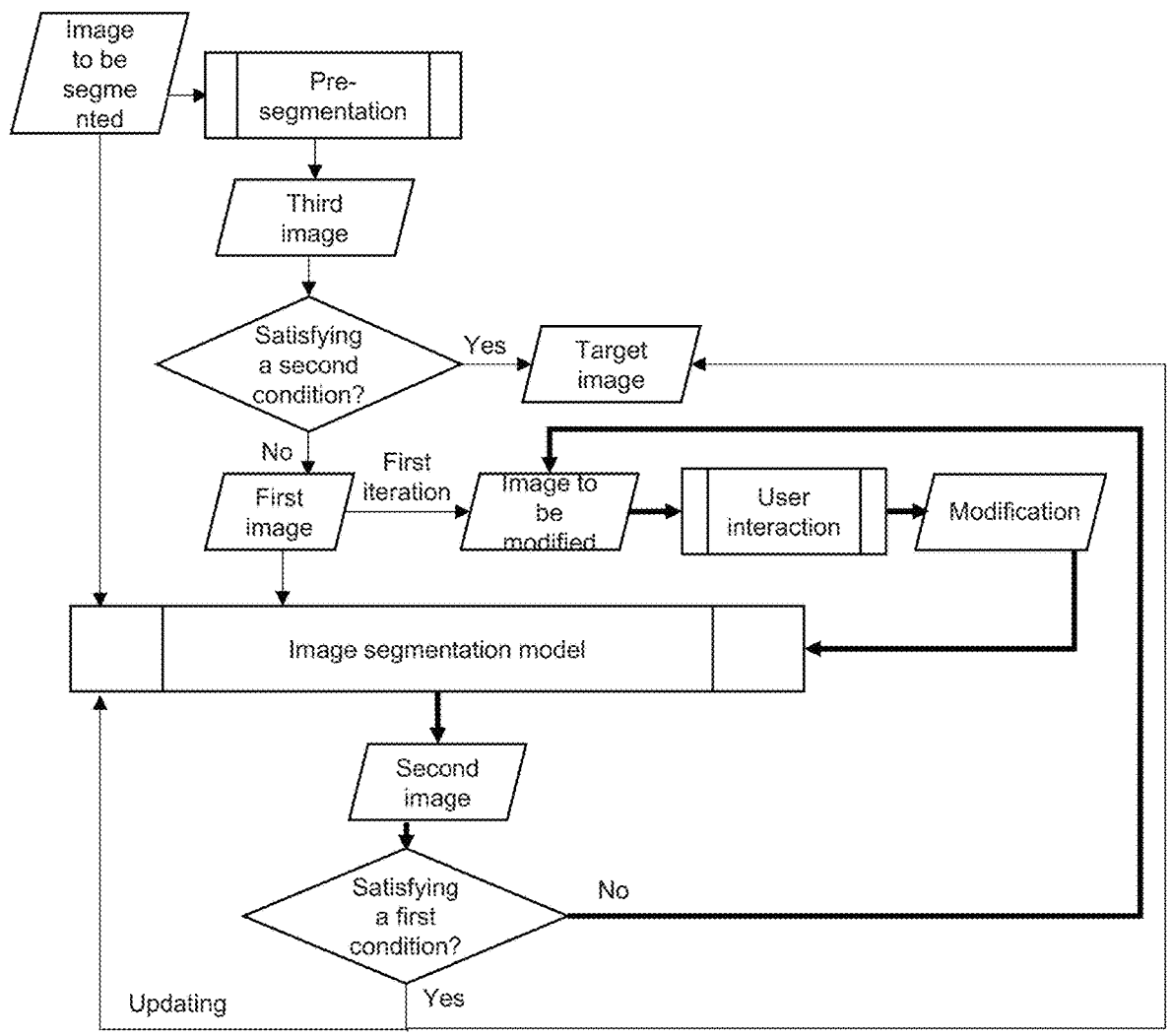
FIG. 7 is a flowchart illustrating an exemplary image segmentation process according to some embodiments of the present disclosure.

As shown in FIG. 7, the processing device 110 may further determine whether the third image satisfies a second condition. In response to determining that the third image satisfies the second condition, the processing device 110 may determine the third image as a target image. In response to determining that the third image does not satisfy the second condition, the processing device 110 may determine the third image as the first image.

The second condition refers to a condition that the third image satisfies a segmentation requirement. The segmentation requirement may indicate that the identification of the target region meets a user's requirement. It can be understood that the pre-segmentation model may have an error in the identification of the target region, which does not satisfy the segmentation requirement. For example, in the third image, a portion of the target region may be determined as the background region, and/or a portion of the background region may be determined as the target region. Therefore, the processing device 110 may determine whether the third image satisfies the segmentation requirement based on the second condition.

In some embodiments, the second condition may refer to a condition that a user determines that the third image satisfies the segmentation requirement.

As described above, the pre-segmentation model may be a pre-trained model. In some embodiments, the pre-segmentation model may be trained based on a plurality of sample images each of which corresponds to a gold standard (i.e., a segmentation result of the sample image). In some embodiments, the gold standard may be obtained by manual segmentation of the plurality of sample images, or may be obtained by segmenting the plurality of sample images using an image segmentation algorithm.

In some embodiments, the third image may be evaluated based on a similarity measurement function. In some embodiments, the second condition may include that a value of a similarity measurement function between a segmentation result of the third image and a standard segmented image corresponding to the image to be segmented is greater than a second threshold (e.g., 50%, 60%, 70%, 80%, 90%, 95%, etc.). The similarity measurement function may be an evaluation index of the relationship between the segmentation result of the third image and the standard segmented image corresponding to the image to be segmented. In some embodiments, the value of the similarity measurement function value may be a numerical value. The larger the numerical value, the closer the segmentation result of the third image is to the standard segmented image corresponding to the image to be segmented. In some embodiments, the similarity measurement function may include a dice similarity coefficient, an intersection over union (IOU) coefficient, a Hausdorff distance, a cross entropy, or the like, or any combination thereof. For example, if the second threshold is 80% and the value of the similarity measurement function is 70%, the third image may not satisfy the second condition.

In some embodiments, the standard segmented image corresponding to the image to be segmented may include a region similar to the target region of the image to be segmented, and include a segmentation result of the similar region that meets the user's requirement. At least one of the type, size, location in the image, corresponding slice in the target object of the similar region in the standard segmented image may be similar to the target region in the image to be segmented.

For example, the image to be segmented may be a heart image of which the target region is the left ventricle in the image to be segmented. The standard segmented image corresponding to the image to be segmented may also be a heat image including the left ventricle, and the standard segmented image corresponding to the image to be segmented may include a segmentation result of the left ventricle that meets the user's requirement. At least one of the size, location in the image, corresponding slice of the left ventricle in the standard segmented image may be similar to those of the left ventricle in the image to be segmented.

In some embodiments, the target image refers to a segmented image of the image to be segmented that satisfies the segmentation requirement, that is, the target image may be the image to be segmented with an identification of the target region that satisfies the segmentation requirement. A type and format of the target image may be similar to the image to be segmented, which will not be repeated here.

In some embodiments, the first image refers to a medical image that does not satisfy the segmentation requirement and needs segmentation to identify the target region, e.g., the first image may be the image to be segmented with an identification of the target region that does not satisfy the segmentation requirement. The first image may correspond to the image to be segmented. A type and format of the first image may be similar to the image to be segmented, which will not be repeated here.

In some embodiments, the processing device 110 may determine whether the third image satisfies the second condition using a determination model. In some embodiments, the determination model may include a support vector machine model, a logistic regression model, a naive Bayes classification model, a Gaussian distribution Bayes classification model, a decision tree model, a random forest model, a KNN classification model, a neural network model, or the like, or any combination thereof.

In some embodiments, the processing device 110 may also send the third image to a user terminal (e.g., the terminal 130), and determine whether the third image satisfies the second condition based on the user's determination result received from the user terminal.

Figure 8B:
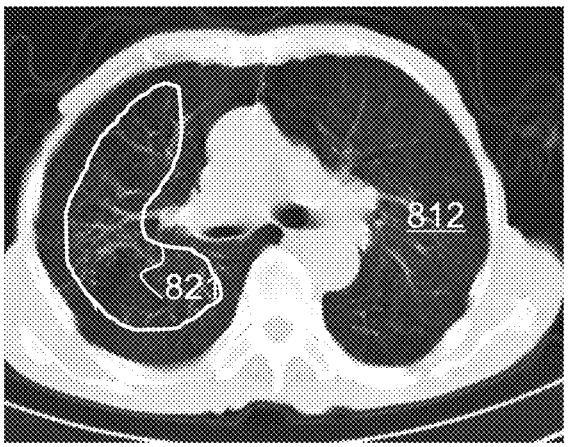
FIG. 8b is a schematic diagram illustrating an exemplary third image according to some embodiments of the present disclosure.

Merely by way of example, FIG. 8b is a schematic diagram illustrating an exemplary third image 820 according to some embodiments of the present disclosure. The pre-segmentation model may perform a rough segmentation processing on the image 810 to be segmented in FIG. 8a to obtain a third image 820. As shown in FIG. 8b, the third image 820 may include a boundary 821 representing an identification of the target region of the image 810. In the third image 820, a region within the boundary 821 may be deemed as the target region, and a region outside the boundary 821 may be deemed as the background region. In the third image 820, the region 812 is deemed as the background region but actually belongs to the target region. Therefore, the third image 820 may not satisfy the second condition and be determined as the first image.

In some embodiments, the process of obtaining the third image (i.e., the pre-segmentation of the image to be segmented) may be omitted. In this case, the image to be segmented may be directly determined as the first image.

In 420, the processing device 110 (e.g., a target image generation module 1220 in FIG. 12) may perform an iteration process for obtaining a target image. The target image may include an identification of a target region in the image to be segmented. For example, the target image may be the image to be segmented with an identification of the target region that satisfies the segmentation requirement. In some embodiments, the iteration process may include one or more iterations. For example, one of the one or more iterations may include operations 421-425 in FIG. 4.

Figure 12:
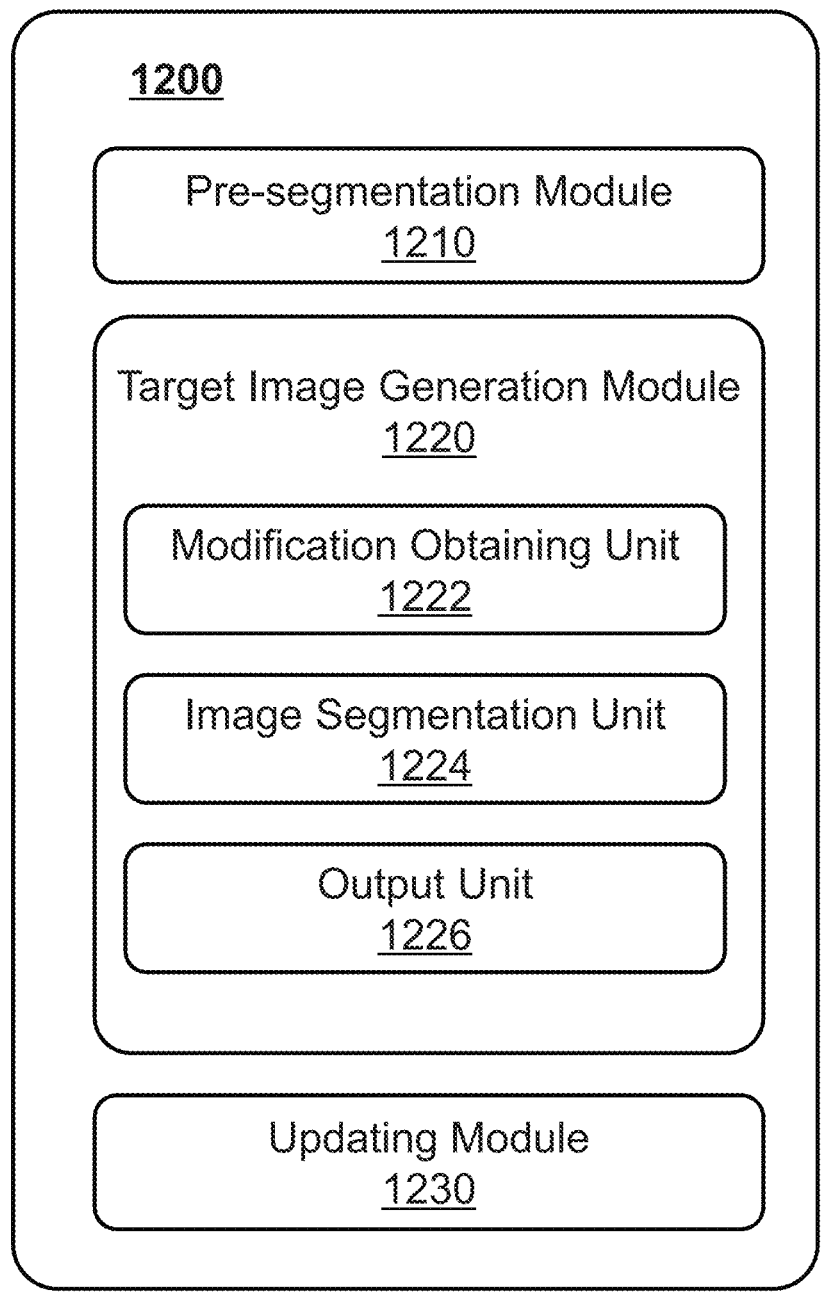
FIG. 12 is a schematic block diagram illustrating an exemplary processing device according to some embodiments of the present disclosure.

In 421, the processing device 110 (e.g., the target image generation module 1220 and/or a modification obtaining unit 1222 in FIG. 12) may obtain an image to be modified. The image to be modified may include the first image in a first iteration of the one or more iterations of the iteration process, or an image generated by an image segmentation model in a previous iteration.

An image to be modified refers to a medical image that needs to be processed based on user interaction.

In the first iteration, the image to be modified may be the first image. As described above, there may be an error in the pre-segmentation model's identification of the target image of the first image. Therefore, the first image may be determined as the image to be modified to be processed based on user interaction.

In the subsequent iteration process, the image to be modified may be a second image generated in a previous iteration. More descriptions regarding the second image may be found elsewhere (e.g., in connection with operation 423) in the present disclosure, which will not be repeated here.

In 422, the processing device 110 (e.g., the target image generation module 1220 and/or the modification obtaining unit 1222) may obtain one or more modifications performed, by one or more users, on the image to be modified.

A modification may reflect an operation relating to identification of the target region performed on the image to be modified. In some embodiments, the operation relating to identification of the target region may include adding, deleting, or adjusting the identification of the target region in the image to be modified. For example, the image to be modified may be the image to be segmented that includes no identification of the target region. The user may delineate an outline of the target region in the image to be segmented, and one or more modifications may be obtained. As another example, the image to be modified may be the first image that includes a preliminary identification of the target region. There may be an error of the boundary between the target region and the background region in the preliminary identification in the first image. The user may modify the preliminary identification of the target region in the first image, and one or more modifications may be obtained.

It can be understood that the aforementioned user interaction may be realized by modifying the image to be modified by the user. In some embodiments, there may be an error of the boundary between the target region and the background region in the image to be modified, and the one or more modifications may be to alleviate or remove the error.

In some embodiments, the modification may include marking (e.g., using a frame selection, a circle selection, etc.) an incorrectly delineated region, deleting an incorrectly delineated boundary, delineating a boundary, or the like, or any combination thereof. The marking the incorrectly delineated region refers to that the user can mark a region that is delineated to the background region but actually belongs to the target region, or mark a region that is delineated to the target region but actually belongs to the background region. The deleting the incorrectly delineated boundary and delineating the boundary refer to that the user directly corrects the delineated boundary in the image to be modified. In some embodiments, the one or more modifications may also include a modified image corresponding to the image to be modified.

A user (e.g., the user 150) may be an entity who modifies the image to be modified on the user terminal (e.g., the terminal 130). In some embodiments, the user may include a hospital, a department of a hospital, or a doctor. It can be understood that different users may have different modifications to the image to be modified.

In some embodiments, the processing device 110 may send the image to be modified to the user terminal via the network 120. The user may modify the image to be modified on the user terminal (e.g., through the display 320), and then the user terminal may send the modification to the processing device 110.

More descriptions regarding at least one modification of the image to be modified performed by the user may be found elsewhere (e.g., in connection with operation 520) in the present disclosure, which will not be repeated here.

Figure 8C:
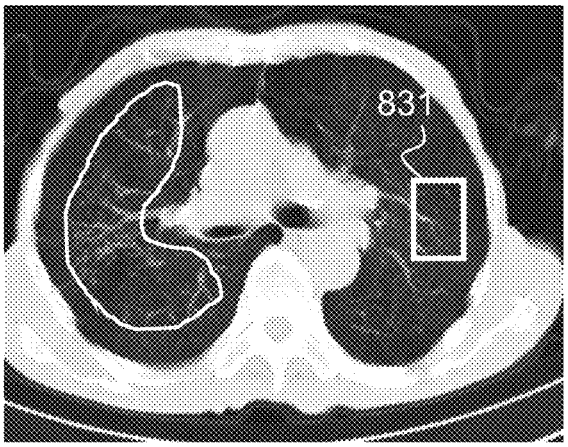
FIG. 8c is a schematic diagram illustrating an exemplary modification performed on the third image illustrated in FIG. 8b according to some embodiments of the present disclosure.

Merely by way of example, FIG. 8c is a schematic diagram illustrating an exemplary modification according to some embodiments of the present disclosure. The processing device 110 may sent the image 820 to be modified to the terminal 130. The user 150 may modify the image 820 to be modified in the terminal 130 (e.g., through the display 320). For example, the user 150 may add a frame 831 in the second portion 812 of the image 820 to be modified, which indicates that the region corresponding to the frame 831 should be determined as the target region. In some embodiments, the frame 831 and/or the image 830 with the frame 831 may be used as the one or more modifications, and may be sent from the terminal 130 to the processing device 110.

In 423, the processing device 110 (e.g., the target image generation module 1220 and/or an image segmentation unit 1224) may generate a second image by inputting the image to be segmented, the image to be modified, and the one or more modifications into the image segmentation model.

The second image refers to a medical image obtained by performing, by the image segmentation model, segmentation processing on the image to be modified. For example, the second image may be the image to be segmented with an identification of the target region. As shown in FIG. 7, the input of the image segmentation model may include the image to be segmented, the image to be modified, and at least one modification of the image to be modified, and the output of the image segmentation model may be the second image.

In some embodiments, the image segmentation model may include an image block segmentation layer, a feature extraction layer, a combination layer, and an output layer.

In some embodiments, the image block segmentation layer may segment, through a multi-scale sliding window, a selective search, a neural network, or other methods, a plurality of first image blocks from the image to be segmented and a plurality of second image blocks from the image to be modified. Each of the plurality of first image blocks of the image to be segmented may correspond to one of the plurality of second image blocks of the image to be modified. For example, a first image block and a corresponding second image block may correspond to a same position of the target object.

The feature extraction layer may extract one or more image feature vectors of the plurality of first image blocks. The one or more image feature vectors may indicate one or more image features (e.g., pixel values) of the plurality of first image blocks. The feature extraction layer may extract one or more identification feature vectors of the plurality of second image blocks. The one or more identification feature vectors may indicate whether one of the plurality of first image blocks is determined as the target region or the background region in the image to be modified. The feature extraction layer may extract one or more modification feature vectors included in the one or more modifications. The one or more modification feature vectors may indicate whether one of the plurality of first image blocks is determined as the target region or the background region based on the one or more modifications.

The combination layer (also referred to as mapping layer) may determine a plurality of segmentation probabilities each of which corresponds to one of the plurality of first image blocks based on the one or more image feature vectors, the one or more identification feature vectors, and the one or more modification feature vectors. The segmentation probability may represent a probability that a first image block belongs to the target region (or the background region). The output layer may output a result relating to distinguishing the target region and the background region on the image to be segmented or the image to be modified based on the segmentation probabilities and a probability threshold. For example, the output layer may determine that the first image block of which the segmentation probability is larger than the probability threshold belongs to the target region or the background region. The output layer may delineate a boundary between the deemed target region and the deemed background region, and output a second image in which a boundary configured to identify the target region and/or the background region is delineated.

In some embodiments, the image segmentation model may include, but is not limited to, a fully convolutional networks (FCN) model, a visual geometry group net (VGG Net) model, an efficient neural network (ENet) model, a full-resolution residual networks (FRRN) model, a mask region-based convolutional neural network (Mask R-CNN) model, multi-dimensional recurrent neural networks (MDRNNs), or the like, or any combination thereof.

Taking FIGS. 8a through 8d as an example, the pre-segmentation model may output the third image 820 based on the image 810 to be segmented. The third image 820 may be determined as the first image. In the first iteration, the image 820 may be determined as the image to be modified. In the image 820, the portion 812 of the target region is determined as the background region. A user may select the incorrectly delineated region on the image 820 using a frame 831, and one or more modifications (i.e., the frame 831) may be obtained. In the first iteration, the processing device 110 may output the second image 840 based on the image 810 to be segmented, the image 820 to be modified, and the at least one modification (i.e., the frame 831). It can be understood that any shape of the frame 831 may be used to select and delineate the incorrect region, which is not limited to the present disclosure.

Figure 8D:
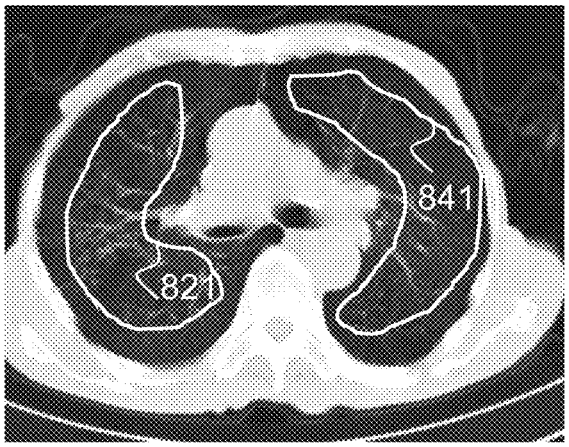
FIG. 8d is a schematic diagram illustrating an exemplary second image according to some embodiments of the present disclosure.

As shown in FIG. 8d, compared with the image 820, the second image 840 may further include a boundary 841. In the second image 840, a region within the boundaries 821 and 841 may be deemed as the target region, and a region outside the boundaries 821 and 841 may be deemed as the background region. The identification of the target region in the second image 840 may be more accurate than the identification of the target region in the third image 820.

In some embodiments, the input of the image segmentation model may also include only the image to be modified and at least one modification of the image to be modified. In this case, the feature extraction layer of the image segmentation model may extract the one or more image feature vectors from the image to be modified.

In 424, the processing device 110 (e.g., the target image generation module 1220 and/or the image segmentation unit 1224) may determine whether the second image satisfies a first condition.

In some embodiments, the processing device 110 may send the second image to the user terminal (e.g., the terminal 130) via the network 120 and receive a user's determination on whether the second image satisfies the first condition from the user terminal.

As described above, the target image refers to the image to be segmented with an identification of the target region that satisfies the user's segmentation requirement, that is, a medical image that does not require further segmentation processing based on user interaction. An image to be modified refers to the image to be segmented with an identification of the target region that does not satisfy the user's segmentation requirement, that is, a medical image needs to be further segmented based on user interaction.

The first condition refers to a condition that the second image satisfies the user's segmentation requirement. It can be understood that the identification of the target region in the second image may still have errors, or may not satisfy the segmentation habit of a specific user, thereby failing to satisfy the segmentation requirement. Therefore, the processing device 110 may send the second image to the user terminal, and determine whether the second image satisfies the first condition based on the user's determination received from the user terminal.

More descriptions regarding determining whether the second image satisfies the first condition by the user based on the user terminal may be found elsewhere (e.g., in connection with operation 540 in FIG. 5) in the present disclosure, which will not be repeated here.

In some embodiments, the processing device 110 may also determine whether the second image satisfies the first condition using a determination model, which may be similar to the process for determining whether the third image satisfies the second condition using a determination model, in connection with operation 410 and will not be repeated here.

In response to determining that the second image does not satisfy the first condition, the processing device 110 (e.g., the target image generation module 1220 and/or the image segmentation unit 1224) may initiate a new iteration of the iteration process by determining the second image generated in the current iteration as the image to be modified of the new iteration.

Merely by way of example, FIG. 8d is a schematic diagram illustrating an exemplary second image 840 according to some embodiments of the present disclosure. As shown in FIG. 8d, the second image 840 may include a boundary 821 and a boundary 841 representing an identification of the target region. In the second image 840, a region within the boundary 821 and the boundary 841 may be deemed as the target region, and a region outside the boundary 821 and the boundary 841 may be deemed as the background region. As shown in the second image 840, there is still an error region that is deemed as the background region but actually belongs to the target region, and the size of the error region does not satisfy the segmentation requirement. Therefore, the second image 840 may not satisfy the first condition. The second image 840 may be determined as the image to be modified of the second iteration.

In some embodiments, the processing device 110 may iteratively perform operation 420 until the target image is acquired.

In response to determining that the second image satisfies the first condition, the process 400 may proceed to operation 425, in which the processing device 110 (e.g., the target image generation module 1220 and/or an output unit 1226) may terminate the iteration process by determining the second image in the current iteration as the target image.

Taking FIG. 8d as an example, the processing device 110 may initiate a second iteration by determining the image 840 as a new image to be modified, and perform operation 420 again. The processing device 110 may send the image 840 to the terminal 130. The user 150 may modify the image 840 in the terminal 130 (e.g., through the display 320). For example, the user 150 may add a frame 851 in the image 840, which indicates that the region corresponding to the frame 851 should be determined as the target region. In some embodiments, the frame 851 and/or the image 850 with the frame 851 may be used as the one or more modifications, and may be sent from the terminal 130 to the processing device 110.

The image 810 to be segmented, the image 840 to be modified, and the at least one modification (i.e., the frame 851 and/or the image 850) of the image 840 to be modified may be input into the image segmenting module, and the image segmenting module may output a second image 860. As shown in FIG. 8f, the image 860 may include a boundary 861 that is approximate to the outline of the target region. Therefore, the image 860 may be determined to satisfy the first condition and output as the target image.

In 420, the processing device 110 (e.g., an updating module 1230 in FIG. 12) may update the image segmentation model based on the target image.

In some embodiments, after generating the target image, the processing device 110 may update one or more parameters of the image segmentation model based on the target image.

In some embodiments, the image segmentation model may be a pre-trained model based on an initial training sample set. In some embodiments, the initial training sample set may include at least one sample image and at least one sample target image corresponding to the at least one sample image.

A sample image refers to a medical image that has not been segmented. In some embodiments, the sample image may be obtained by reading data from a storage device, calling a related interface, or other methods. In some embodiments, the sample image may be obtained from a large-scale sample library (e.g., medical image database, etc.) of different users. The sample image may include a region to be segmented.

A sample target image corresponding to a sample image refers to a medical image that include an identification of the region to be segmented, e.g., the sample image with the identification of the region to be segmented. The identification of the region to be segmented satisfies the segmentation requirement. In some embodiments, the sample target image may be obtained by segmenting the sample image by different users. In some embodiments, the sample target image may be obtained by reading data from a storage device, calling a related interface, or other methods.

It can be understood that the image segmentation model trained based on the initial training sample set may be suitable for segmentation requirement of general users but have poor adaptability to a specific segmentation requirement of specific users (e.g., doctors in a specific hospital, doctors in a specific department, etc.). Therefore, one or more parameters of the image segmentation model may be updated based on an updating sample set obtained interactively by the specific users, so as to improve the adaptability of the image segmentation model to the specific segmentation requirement of the specific users.

In some embodiments, the one or more parameters to be updated of the image segmentation model may indicate an image modification characteristic of one or more users. For example, a general way of segmenting a heart image may be to regard the left ventricle and the right ventricle as the target region, while a habit of hospital A of segmenting a heart image may be to only regard the left ventricle as the target region. A pre-trained image segmentation model may regard the left ventricle and the right ventricle as the target region. After the pre-trained image segmentation model is updated using an updating sample set obtained interactively from the specific users of hospital A, the updated parameters of the image segmentation model may change the general way of extracting the left ventricle and the right ventricle to a specific way of extracting only the left ventricle, so that the segmentation habits of heart images of the updated image segmentation model may be more in conformity with the requirements of the hospital A.

In some embodiments, the parameters of the image segmentation model may also include, for example, a model network architecture, a neuron weight, a loss function, etc., which are not limited in the present disclosure.

In some embodiments, the parameters of the image segmentation model may be updated based on an updating sample set. Specifically, the labeled training samples may be input into the image segmentation model, and the parameters of the image segmentation model may be updated during the training.

More descriptions regarding updating the parameters of the image segmentation model based on the target image may be found elsewhere in the present disclosure. See, e.g., FIG. 6 and the relevant descriptions thereof.

In some embodiments, the updating sample set may also include artificially modified trajectories, so that the trained image segmentation model may learn the user's modification intention during the modification process, thereby improving the segmentation accuracy and flexibility of the image segmentation model.

More descriptions regarding updating the parameters of the image segmentation model based on the artificially modified trajectories may be found elsewhere in the present disclosure. See, e.g., FIGS. 9A-11 and the relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 430 may be omitted.

FIG. 5 is a flowchart illustrating an exemplary image segmentation process 500 according to some embodiments of the present disclosure. In some embodiments, the process 500 may be implemented in the image segmentation system 100 illustrated in FIG. 1A. For example, the process 500 may be stored in a storage medium (e.g., the storage device 140, the storage 390 of the terminal 130, or the memory 360 of the terminal 130) as a form of instructions, and can be invoked and/or executed by the terminal 130 (e.g., the CPU 340 of the terminal 130, the GPU 330 of the terminal 130, or one or more modules in the terminal 130 illustrated in FIG. 13). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the terminal 130 (e.g., an image receiving module 1310 in FIG. 13) may receive an image to be modified associated with an image to be segmented from the processing device 110.

More descriptions regarding the image to be modified and the image to be segmented may be found elsewhere (e.g., in connection with the process 400 in FIG. 4) in the present disclosure, which will not be repeated here.

Figure 13:
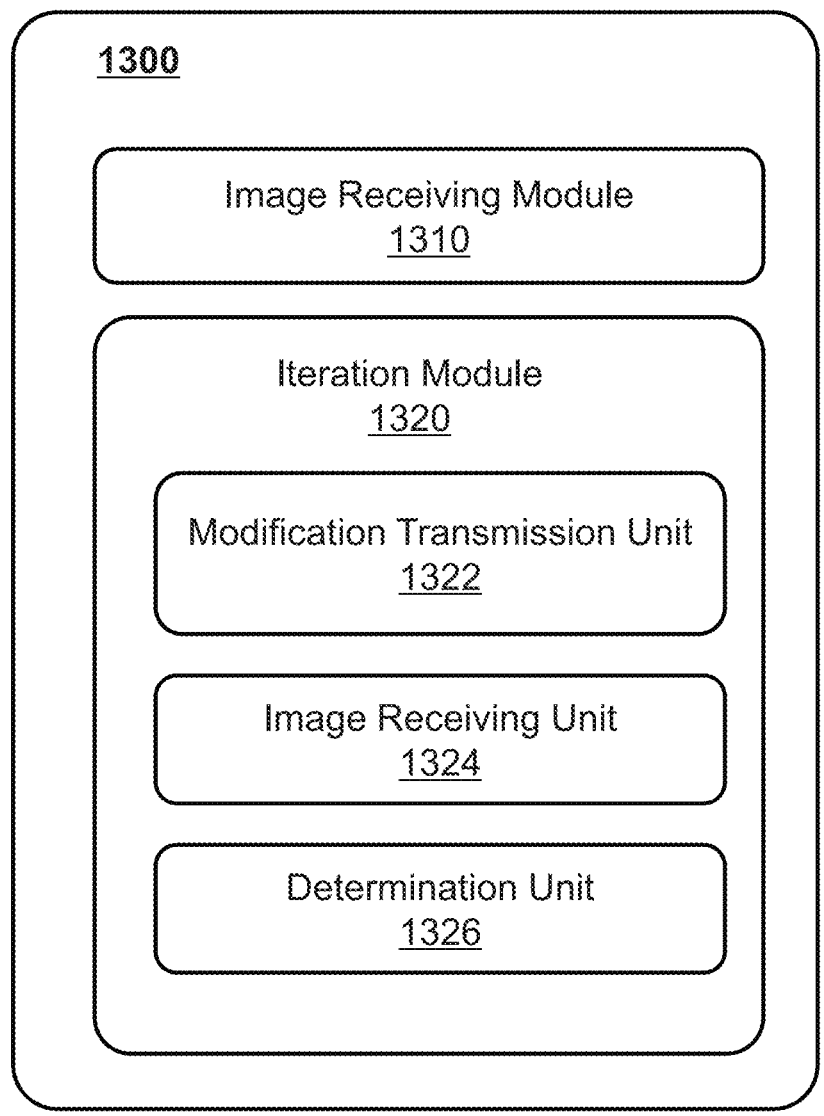
FIG. 13 is a schematic block diagram illustrating an exemplary terminal according to some embodiments of the present disclosure.

In 520, the terminal 130 (e.g., the iteration module 1320 and/or a modification transmission unit 1322 in FIG. 13) may obtain one or more modifications performed, by one or more users, on the image to be modified.

As described above, a user may be an entity who modifies the image to be modified on the user terminal (e.g., the terminal 130). In some embodiments, the user may modify the image to be modified by touching or clicking the screen of the user terminal, or by inputting, to the terminal 130, an instruction (e.g., text instruction, voice instruction, image instruction, video instruction, etc.) for modifying the image to be modified.

More descriptions regarding the at least one modification of the image to be modified may be found elsewhere (e.g., in connection with the process 400 in FIG. 4) in the present disclosure, which will not be repeated here.

In some embodiments, the terminal 130 may obtain the at least one modification by detecting the user's touching or clicking operation on the screen of the user terminal, or the input instruction for modifying the image to be modified.

In 530, the terminal 130 (e.g., the iteration module 1320 and/or the modification transmission unit 1322 in FIG. 13) may send the one or more modifications to the processing device 110.

In some embodiments, the terminal 130 may send the at least one modification to the processing device 110 via the network 120.

In 540, the terminal 130 (e.g., the iteration module 1320 and/or an image receiving unit 1324 in FIG. 13) may receive a segmented image (e.g., a second image) from the processing device 110.

More descriptions regarding the second image may be found elsewhere in the present disclosure. See, e.g., FIG. 4 and the relevant descriptions thereof.

In some embodiments, the terminal 130 may receive the second image from the processing device 110 via the network 120.

In 550, the terminal 130 (e.g., the iteration module 1320 and/or a determination unit 1326 in FIG. 13) may determine whether the second image satisfies a first condition. More descriptions regarding the first condition may be found elsewhere in the present disclosure. See, e.g., FIG. 4 and the relevant descriptions thereof.

The user 150 may determine whether the second image received by the user terminal satisfies the user's segmentation requirement. For example, the user terminal may obtain the user's determination (e.g., "yes" or "no") by obtaining the user's touching, clicking, text inputting, voice inputting, image inputting, video inputting, or gesture (e.g., nodding, shaking one's head, hand gesture, etc.) inputting operations on the user terminal.

In 560, the terminal 130 (e.g., the iteration module 1320 and/or the determination unit 1326 in FIG. 13) may send the determination on whether the second image satisfies the first condition to the processing device 110.

In some embodiments, the terminal 130 may send the determination to the processing device 110 via the network 120.

In some embodiments, the terminal 130 and the processing device 110 may be located in a same device, and the device may execute the process 400 and the process 500 described in FIG. 4 and FIG. 5.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 6 is a flowchart illustrating an exemplary process 600 for updating an image segmentation model based on a target image according to some embodiments of the present disclosure. In some embodiments, the process 600 may be implemented in the image segmentation system 100 illustrated in FIG. 1A. For example, the process 600 may be stored in a storage medium (e.g., the storage device 140, the storage 220, the storage 390, the memory 360, etc.) as a form of instructions, and can be invoked and/or executed by the processing device 110 (e.g., the processor 210 of the processing device 110, or one or more modules in the processing device 110 illustrated in FIG. 12) and/or the terminal 130 (e.g., the CPU 340, the GPU 330, or one or more modules illustrated in FIG. 13). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, the process 600 may be implemented in the first computing system 162 illustrated in FIG. 1B.

In 610, the processing device 110 (e.g., an updating module 1230 in FIG. 12) may obtain an updating sample set.

An updating sample set refers to a collection of training samples and labels (e.g., gold standard) of the training samples. In some embodiments, the updating sample set may include the training samples and the labels obtained based on user interaction (e.g., as shown in FIG. 4). The updating sample set may include an image to be segmented, a first image, and a target image of the iteration process illustrated in FIG. 4.

In some embodiments, the image to be segmented and the first image may be used as a training sample. Taking FIGS. 8a-8f as an example, the training sample may include the image 810 to be segmented and the first image 820.

In some embodiments, the updating sample set may further include at least one modification performed on the image to be modified in at least one iteration of the iteration process. The at least one modification may be used as the training sample.

In some embodiments, all the modifications obtained in the iteration process may be used as the training sample.

For example, the modification (e.g., the frame 831 and/or the image 830) of the image 820 to be modified in the first iteration of the iteration process and the modification (e.g., the frame 851 and/or the image 850) of the image 840 in the second iteration of the iteration process may be used as the training sample. In this case, the training sample may include the image 810 to be segmented, the first image 820, the frame 831 (and/or the image 830), and the frame 851 (and/or the image 850).

In some embodiments, a portion of the modifications obtained in the iteration process may be used as the training sample.

For example, assuming that the frame 831 performed on the image 820 in the first iteration may be an incorrect operation of the user, only the modification (e.g., the frame 851 and/or the image 850) performed on the image 840 in the second iteration may be used as the training sample. In this case, the training sample may include the image 810 to be segmented, the first image 820, and the frame 851 (and/or the image 850).

In some embodiments, the image to be segmented may be omitted in the updating sample set. For example, the training sample may include the image 820, the frame 831 (and/or the image 830), and the frame 851 (and/or the image 850).

In some embodiments, the target image generated in the process 400 may be used as the label of the training sample.

For example, the image 810 to be segmented, the first image 820, the frame 831 (and/or the image 830), and the frame 851 (and/or the image 850) may be used as the training sample, and the target image 860 may be used as a label. The updating sample set may be represented as [Training sample: image 810, image 820, modification 831, modification 851 label: image 860]. Alternatively, the image 810 to be segmented, the first image 820, and the frame 851 (and/or the image 850) may be used as the training sample, and the target image 860 may be used as a label. The updating sample set may be represented as [Training sample: image 810, image 820, modification 851 label: image 860].

In 620, the processing device 110 (e.g., the updating module 1230 in FIG. 12) may update one or more parameters of an image segmentation model (e.g., the image segmentation model used in the process 400 in FIG. 4) based on the updating sample set.

As described above, the one or more parameters to be updated of the image segmentation model may indicate an image modification characteristic of one or more users. In some embodiments, the image segmentation model may be updated based on the updating sample set, thereby updating the parameters of the image segmentation model.

In some embodiments, the updating may be performed using a common training method. For example, the updating may be performed based on a gradient descent method, a Newton method, a quasi-Newton method, etc.

In some embodiments, during the updating process, the processing device 110 may input the training sample of the updating sample set into the image segmentation model. The image segmentation model may output an output image based on the training sample. The processing device 110 may determine a loss function based on the output image and the target image that is used as a label in the updating sample set. The processing device 110 may determine whether a terminal condition is satisfied. In response to determining that the terminal condition is satisfied, the processing device 110 may output the current image segmentation model. In response to determining that the terminal condition is not satisfied, the processing device 110 may update the image segmentation model based on the loss function and initiate a new iteration. In the new iteration, the input of the updated image segmentation model may be the training sample and the output image generated in the previous iteration, and so on. An exemplary termination condition may include that the value of the loss function in the current iteration is less than a threshold value. Other exemplary termination conditions may include that a maximum number (or count) of iterations has been performed, a difference between the values of the loss function obtained in a previous iteration and the current iteration (or among the values of the loss function within a certain number or count of successive iterations) is less than a certain threshold (e.g., convergence of the loss function occurs).

It can be understood that the more frequently the user uses the image segmentation model to obtain the target image, the larger the count of updating sample sets generated during the usage of the image segmentation model may be, the closer the output result of the updated image segmentation model may be to a desired result of the user, and the higher the accuracy of the updated image segmentation model may be.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the process 600 may also be performed by an external device communicating with the image segmentation system 100.

FIG. 7 is a flowchart illustrating an exemplary image segmentation process 700 according to some embodiments of the present disclosure. The process 700 combines the process 400 and the process 500.

As shown in FIG. 7, an exemplary image segmentation process 700 based on user interaction may include the following operations. A third image may be obtained by performing pre-segmentation on an image to be segmented. If the third image satisfies a second condition, the third image may be directly output as a target image. If the third image does not satisfy the second condition, the third image may be used as a first image and input into an iteration process for further segmentation.

The iteration process may include one or more iterations. One of the one or more iterations may include the following operations.

An image to be modified may be obtained. The image to be modified may include the first image in a first iteration of the one or more iterations of the iteration process, or an image generated by an image segmentation model in a previous iteration. The image to be modified may be modified by a user, and one or more modifications of the image to be modified may be obtained. The image segmentation model may output a second image based on the image to be segmented, the image to be modified, and the one or more user's modifications of the image to be modified. If the user determines that the second image does not satisfy a first condition that satisfies the user's requirement, the second image may be regarded as a new image to be modified to initiate a new iteration of the iteration process, that is, in the new iteration, the image to be modified may be the second image generated in the previous iteration. If the user determines that the second image satisfies the first condition that satisfies the user's requirement, the second image may be output as the target image. The image to be modified, at least one modification of the image to be modified, or the second image of in at least one iteration of the iteration process, and the image to be segmented may be used as training samples, and the target image may be used as a label to update the image segmentation model.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 8a is a schematic diagram illustrating an exemplary image 810 to be segmented according to some embodiments of the present disclosure. As shown in FIG. 8a, the image 810 to be segmented may include a target region that includes a first portion 811 and a second portion 812.

FIG. 8b is a schematic diagram illustrating an exemplary third image 820 according to some embodiments of the present disclosure. The third image 820 may be generated by performing pre-segmentation on the image 810. As shown in FIG. 8b, the third image 820 may include a boundary 821 representing an identification of the target region of the image 810. In the third image 820, a region within the boundary 821 may be deemed as the target region, and a region outside the boundary 821 may be deemed as the background region. In the third image 820, the region 812 is deemed as the background region but actually belongs to the target region. Therefore, the third image 820 may not satisfy the second condition and be determined as the first image. In the first iteration of operation 420 in the process 400, the image 820 may be determined as the image to be modified.

FIG. 8c is a schematic diagram illustrating an exemplary modification performed on the third image 820 illustrated in FIG. 8b according to some embodiments of the present disclosure. The processing device 110 may sent the image 820 to be modified to the terminal 130. The user 150 may modify the image 820 to be modified in the terminal 130 (e.g., through the display 320). For example, the user 150 may add a frame 831 in the second portion 812 of the image 820 to be modified, which indicates that the region corresponding to the frame 831 should be determined as the target region. In some embodiments, the frame 831 and/or the image 830 with the frame 831 may be used as the one or more modifications corresponding to the image 820, and may be sent from the terminal 130 to the processing device 110.

FIG. 8d is a schematic diagram illustrating an exemplary second image 840 according to some embodiments of the present disclosure. In the first iteration of operation 420 in the process 400, the processing device 110 may output the second image 840 based on the image 810 to be segmented, the image 820 to be modified, and the at least one modification (i.e., the frame 831). As shown in FIG. 8d, compared with the image 820, the second image 840 may further include a boundary 841. In the second image 840, a region within the boundaries 821 and 841 may be deemed as the target region, and a region outside the boundaries 821 and 841 may be deemed as the background region. The identification of the target region in the second image 840 may be more accurate than the identification of the target region in the third image 820. As shown in the second image 840, there is still an error region that is deemed as the background region but actually belongs to the target region, and the size of the error region does not satisfy the segmentation requirement. Therefore, the second image 840 may not satisfy the first condition. The second image 840 may be determined as the image to be modified of the second iteration of the process 400.

Figure 8E:
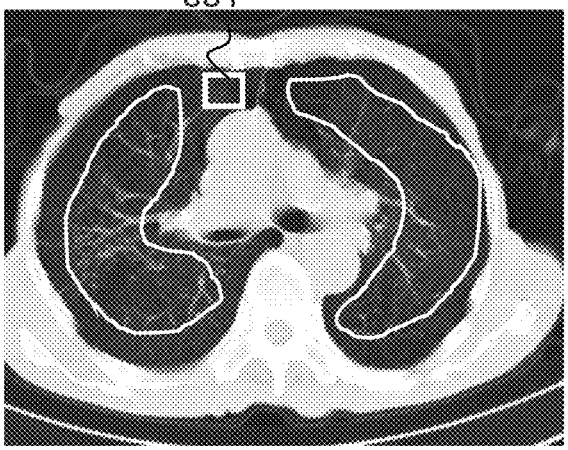
FIG. 8e is a schematic diagram illustrating an exemplary modification performed on the second image illustrated in FIG. 8d according to some embodiments of the present disclosure.
Figure 8F:
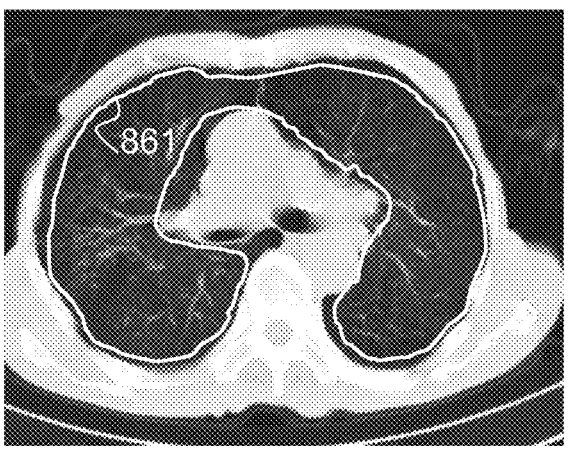
FIG. 8f is a schematic diagram illustrating an exemplary target image according to some embodiments of the present disclosure.

FIG. 8e is a schematic diagram illustrating an exemplary modification performed on the second image 840 illustrated in FIG. 8d according to some embodiments of the present disclosure. The processing device 110 may sent the image 840 to be modified to the terminal 130. The user 150 may modify the image 840 to be modified in the terminal 130 (e.g., through the display 320). For example, the user 150 may add a frame 851 in the image 840 to be modified, which indicates that the region corresponding to the frame 851 should be determined as the target region. In some embodiments, the frame 851 and/or the image 850 with the frame 851 may be used as the one or more modifications corresponding to the image 840, and may be sent from the terminal 130 to the processing device 110.

FIG. 8f is a schematic diagram illustrating an exemplary target image according to some embodiments of the present disclosure. In the second iteration of the process 400, the processing device 110 may output the second image 860 based on the image 810 to be segmented, the image 840 to be modified, and the at least one modification (i.e., the frame 851). As shown in FIG. 8f, the image 860 may include a boundary 861 that is approximate to the outline of the target region. Therefore, the image 860 may be determined to satisfy the first condition and output as the target image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

An image segmentation model can distinguish the complex distribution of various regions in a medical image, so as to provide reliable information for clinical diagnosis and treatment. However, in the traditional training process of the image segmentation model, the image segmentation model is obtained without modification trajectory of a user, and the accuracy and flexibility of the obtained image segmentation model are difficult to improve. Therefore, it is desirable to provide an image segmentation model training method and/or system, which can improve the accuracy and flexibility of the image segmentation model based on the user's modification trajectory.

FIG. 9A is a flowchart illustrating an exemplary process 900-1 for obtaining an image segmentation model according to some embodiments of the present disclosure. In some embodiments, the process 900-1 may be implemented in the image segmentation system 100 illustrated in FIG. 1A. For example, the process 900-1 may be stored in a storage medium (e.g., the storage device 140, the storage 220, the storage 390, the memory 360, etc.) as a form of instructions, and can be invoked and/or executed by the processing device 110 (e.g., the processor 210 of the processing device 110, or one or more modules in the processing device 110 illustrated in FIG. 12) and/or the terminal 130 (e.g., the CPU 340, the GPU 330, or one or more modules illustrated in FIG. 14). The operations of the illustrated process 900-1 presented below are intended to be illustrative. In some embodiments, the process 900-1 may be accomplished with one or more additional operations not described, and/or without one or more of the operations discussed. Additionally, the order in which the operations of the process 900-1 as illustrated in FIG. 9A and described below is not intended to be limiting. In some embodiments, the process 900-1 may be implemented in the first computing system 162 illustrated in FIG. 1B.

In 911, the processing device 110 (e.g., an image obtaining module 1410 in FIG. 14) may obtain an image to be segmented including a target region. The image to be segmented and the target region may be similar to the image to be segmented and the target region illustrated in FIG. 4, which will not be repeated here.

In 912, the processing device 110 (e.g., the image obtaining module 1410 in FIG. 14) may obtain a preliminary segmentation model.

In some embodiments, the preliminary segmentation model refers to an image segmentation model that is trained without user interaction. In some embodiments, the preliminary segmentation model may include an organ identification model.

In some embodiments, the preliminary segmentation model may include a traditional image segmentation model, for example, a threshold model, a region growing model, an edge detection model, and the like, or any combination thereof.

In some embodiments, the preliminary segmentation model may include an image segmentation model combined with a specific tool, for example, a genetic algorithm, wavelet analysis, wavelet transform, an active contour model, or the like, or any combination thereof.

In some embodiments, the preliminary segmentation model may include a neural network model, for example, a Fully Convolutional Networks (FCN) model, a Visual Geometry Group (VGG Net) model, an Efficient Neural Network (ENet) model, a Full-Resolution Residual Networks (FRRN) model, a Mask Region-based Convolutional Neural Network (Mask R-CNN) model, a Multi-Dimensional Recurrent Neural Network Neural Networks (MDRNNs) model, or the like, or any combination thereof.

In 913, the processing device 110 (e.g., the image obtaining module 1410 in FIG. 14) may generate a processed image by inputting the image to be segmented into the preliminary segmentation model.

In some embodiments, the input of the preliminary segmentation model may also include an object type of the image to be segmented, a scanning device type of the image to be segmented, etc., which is not limited in this embodiment.

The processed image may include a medical image obtained after a segmentation process is performed on the image to be segmented using the preliminary segmentation model. For example, the processed image may be regarded as the image to be segmented with a preliminary identification of the target region. The type and format of the processed image may be similar to the image to be segmented in FIG. 4, which will not be repeated here. It can be understood that the preliminary segmentation model may preliminarily identify the target region in the image to be segmented.

In 914, the processing device 110 (e.g., a training set obtaining module 1420 in FIG. 14) may obtain a training set including the processed image, a modification trajectory of at least one modification performed on the processed image, and a target image including an identification of the target region.

It should be understood that the preliminary identification of the target region in the processed image obtained using the preliminary segmentation model may have an error. For example, in the preliminary identification in the processed image, a region that actually belongs to the target region may be deemed as the background region. As another example, in the preliminary identification in the processed image, a region that actually belongs to the background region may be deemed as the target region. As still another example, in the preliminary identification in the processed image, a region that actually belongs to a first target sub-region may be deemed as a second target sub-region region.

One or more users may perform one or more modifications on the processed image to modify at least one error of the identification of the target region in the processed image.

A modification trajectory may include a record of a modification process of performing, by one or more users, the at least one modification on the processed image. In some embodiments, the modification trajectory may include at least one of a location of the at least one modification on the processed image, a type of the at least one modification, or a modification time of the at least one modification.

Detailed description of obtaining the modification trajectory may be found elsewhere in the present disclosure (e.g., in connection with FIG. 10), which may be not described herein.

In 915, the processing device 110 (e.g., a training module 1430 in FIG. 14) may obtain an image segmentation model by training, based on the training set, the preliminary segmentation model.

In some embodiments, the processed image and the modification trajectory may be used as training samples, and the target image corresponding to the image to be segmented may be used as a label (e.g., a gold standard for training the preliminary model).

In some embodiments, the processing device 110 may perform an iteration process for obtaining the image segmentation model. The iteration process may include one or more iterations. Detailed description of the iteration process may be found elsewhere in the present disclosure (e.g., in connection with FIG. 10), which may be not described herein.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the process 900-1 may also be performed by an external device communicating with the image segmentation system 100.

Figure 9B:
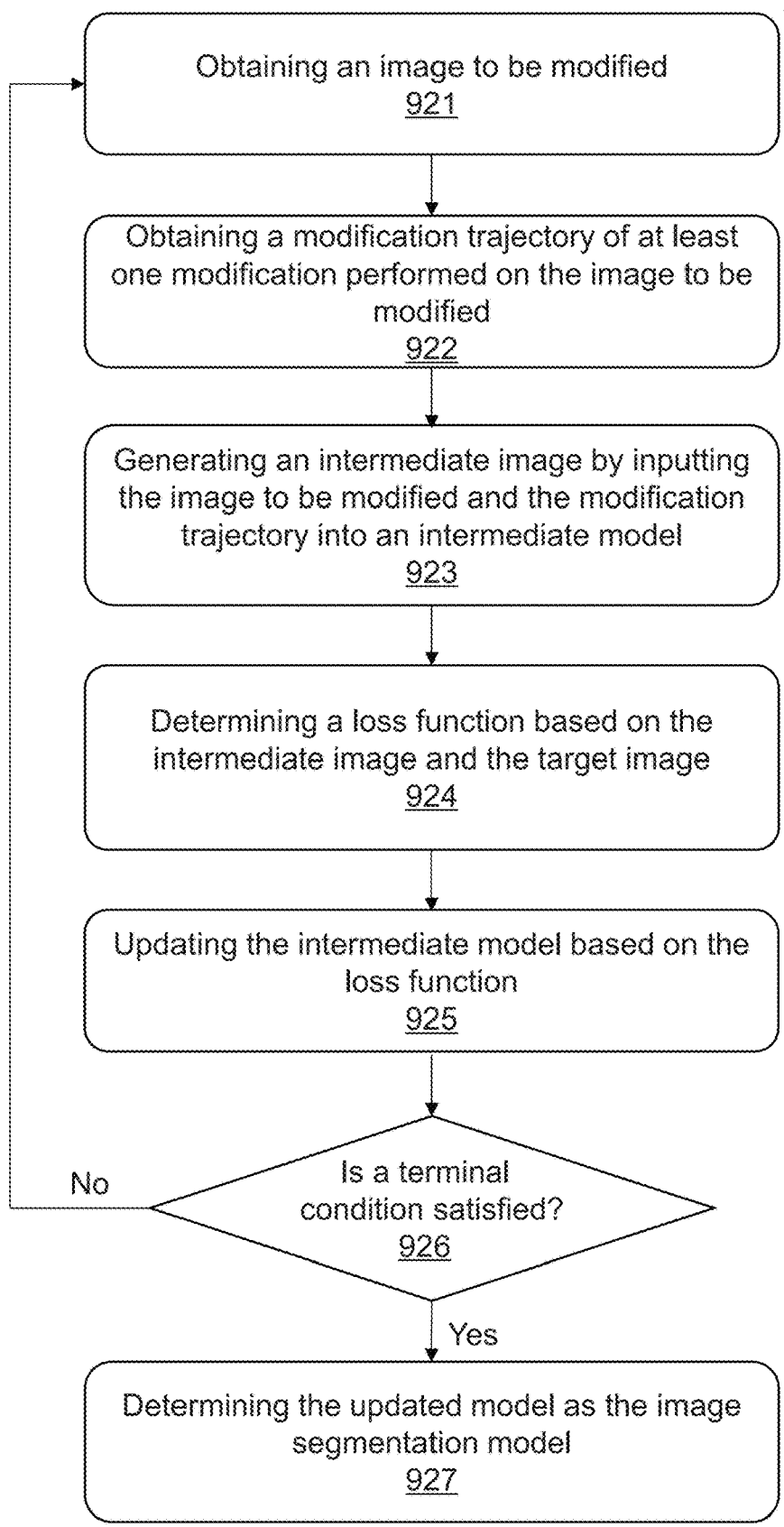
FIG. 9B is a flowchart illustrating an exemplary process for obtaining an image segmentation model according to some embodiments of the present disclosure.

FIG. 9B is a flowchart illustrating an exemplary process 900-2 for obtaining an image segmentation model according to some embodiments of the present disclosure. In some embodiments, the process 900-2 may be implemented in the image segmentation system 100 illustrated in FIG. 1A. For example, the process 900-2 may be stored in a storage medium (e.g., the storage device 140, the storage 220, the storage 390, the memory 360, etc.) as a form of instructions, and can be invoked and/or executed by the processing device 110 (e.g., the processor 210 of the processing device 110, or one or more modules in the processing device 110 illustrated in FIG. 12) and/or the terminal 130 (e.g., the CPU 340, the GPU 330, or one or more modules illustrated in FIG. 14). The operations of the illustrated process 900-2 presented below are intended to be illustrative. In some embodiments, the process 900-2 may be accomplished with one or more additional operations not described, and/or without one or more of the operations discussed. Additionally, the order in which the operations of the process 900-2 as illustrated in FIG. 9B and described below is not intended to be limiting. In some embodiments, the process 900-2 may be implemented in the first computing system 162 illustrated in FIG. 1B. In some embodiments, operation 915 of the process 900-1 in FIG. 9A may be performed based on the process 900-2.

In 921, the processing device 110 (e.g., the training module 1430) may obtain an image to be modified. The image to be modified may include the processed image in a first iteration of the one or more iterations of the iteration process, or an image generated in a previous iteration.

In 922, the processing device 110 (e.g., the training module 1430) may obtain a modification trajectory of at least one modification performed on the image to be modified.

In 923, the processing device 110 (e.g., the training module 1430) may generate an intermediate image by inputting the image to be modified and the modification trajectory corresponding to the image to be modified into an intermediate model. The intermediate model may be the preliminary segmentation model in the first iteration, or an updated model generated in the previous iteration. Detailed description of the output of the intermediate image may be shown in FIG. 11, which may not be described herein.

In 924, the processing device 110 (e.g., the training module 1430) may determine a loss function based on the intermediate image and the target image.

In some embodiments, the processing device 110 may obtain a segmentation probability of each of a plurality of first image blocks of the intermediate image. The segmentation probability may indicate a probability that the first image block belongs to the target region. The processing device 110 may obtain a segmentation type of each of a plurality of second image blocks of the target image. The segmentation type may indicate whether the second image block belongs to the target region. The processing device 110 may determine the loss function based on the segmentation probabilities and the segmentation type.

In some embodiments, a first image block of the processed image may be a part of the processed image. The method for obtaining the first image block may be shown in FIG. 11, and detailed description may not be described herein.

In some embodiments, the intermediate model may output the intermediate image by determining the segmentation probability of each first image block of the processed image to distinguish the target region and the background region. The method for obtaining the segmentation probability of each first image block of the processed image may be shown FIG. 11, and detailed description may not be described herein.

In some embodiments, a second image block of the target image belonging to the target region may be thought that the segmentation probability of belonging to the target region is 1. Accordingly, a second image block of the target image that belongs to the background region may be thought that the segmentation probability of belonging to the target region is 0.

In some embodiments, there may be different tissues in the image to be segmented. The target region may include a plurality of target sub-regions each of which corresponds to at least one tissue. In some embodiments, the segmentation probability corresponding to each first image block of the processed image may also be a probability that the first image block of the processed image belongs to the plurality of target sub-regions or the background region. The intermediate model may obtain the intermediate image by determining the segmentation probability of each first image block to distinguish different target sub-regions and the background region.

In some embodiments, the segmentation type of each second image block of the target image may also represent which of the plurality of target sub-regions and the background region the second image block of the target image belongs to. In some embodiments, a second image block of the target image belonging to a first target sub-region may be thought that the segmentation probability of belonging to the first target sub-region is 1, and the segmentation probability of belonging to other target sub-regions and the background region is 0. Accordingly, a second image block of the target image that does not belong to the first target sub-region (e.g., a second image block of the target image that belongs to a second target sub-region or the background region) may be thought that the segmentation probability of belonging to the first target sub-region is 0.

In some embodiments, each of the plurality of second image blocks of the target image may correspond to one of the plurality of first image blocks of the processed image. For example, a second image block and a corresponding first image block may correspond a same location of the object of the image to be segmented.

For a second image block and a corresponding first image block, the processing device 110 may determine a difference between the second image block and the corresponding first image block. For example, the segmentation type of the second image block indicates that the second image block belongs to the target region, which indicates that the segmentation probability of the second image block is 1. The segmentation probability of the corresponding first image block indicates that the probability that the corresponding first image block belongs to the target region is 0.9. The difference between the second image block and the corresponding first image block is 0.1. As another example, the segmentation type of the second image block indicates that the second image block belongs to a first target sub-region, which indicates that the segmentation probability of the first target sub-region of the second image block is 1. The segmentation probability of the corresponding first image block indicates that the probability that the corresponding first image block belongs to the first target sub-region is 0.3. The difference between the second image block and the corresponding first image block is 0.7. The loss function may be determined based the differences between the first image blocks and the second image blocks.

In some embodiments, the loss function may include a fractional loss function, an absolute value loss function, a logarithmic loss function, a cross entropy loss function, or the like, or any combination thereof.

In 925, the processing device 110 (e.g., the training module 1430) may update the intermediate model based on the loss function.

In 926, the processing device 110 (e.g., the training module 1430) may determine whether a terminal condition is satisfied.

In response to determining that the terminal condition is satisfied, the process 900-2 may proceed to operation 927 in which the processing device 110 may terminate the iteration process by determining the updated model as the image segmentation model.

In response to determining that the terminal condition is not satisfied, the process 900-2 may initiate a new iteration of the iteration process by determining the intermediate image in the current iteration as the image to be modified of the new iteration.

In some embodiments, a common method may be used to update the intermediate model, for example, a method of gradient decrease, Newton, or the like.

In some embodiments, the terminal condition may include that the value of the loss function in the current iteration is less than a threshold value, a maximum number (or count) of iterations has been performed, a difference between the values of the loss function obtained in a previous iteration and the current iteration (or among the values of the loss function within a certain number or count of successive iterations) is less than a certain threshold (e.g., loss function convergence occurs).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the process 900-2 may also be performed by an external device communicating with the image segmentation system 100.

Figure 9C:
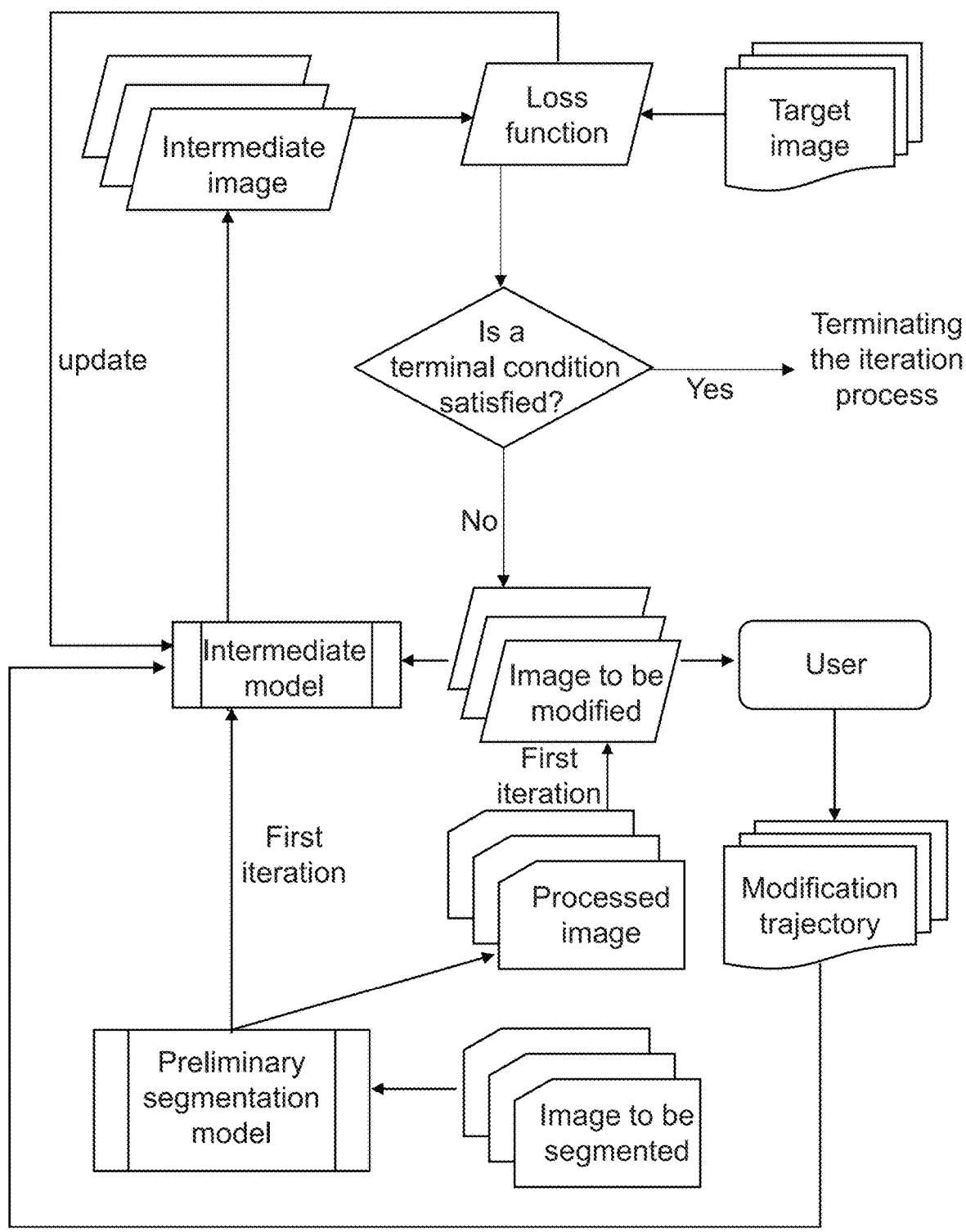
FIG. 9C is a flowchart illustrating an exemplary process for obtaining an image segmentation model according to some embodiments of the present disclosure.

FIG. 9C is a flowchart illustrating an exemplary process 900-3 for obtaining an image segmentation model according to some embodiments of the present disclosure. The process 900-3 combines the process 900-1 and the process 900-2.

As shown in FIG. 9C, an image to be segmented may be obtained as a training sample and a target image corresponding to the image to be segmented may be obtained as a label of the training sample. An iteration process may be performed based on the image to be segmented and the target image to train a preliminary segmentation model. A processed image may be generated by inputting the image to be segmented into the preliminary segmentation model.

An image to be modified may be obtained. The image to be modified may include the processed image in a first iteration of the iteration process, or an image generated in a previous iteration. A modification trajectory of at least one modification performed, by one or more user, on the image to be modified may be obtained. An intermediate image may be generated by inputting the image to be modified and the modification trajectory corresponding to the image to be modified into an intermediate model. The intermediate model may be the preliminary segmentation model in the first iteration, or an updated model generated in the previous iteration. A loss function may be determined based on the intermediate image and the target image. The intermediate model may be updated based on the loss function. A determination relating to whether a terminal condition is satisfied may be obtained. In response to determining that the terminal condition is satisfied, the iteration process may be terminated by determining the updated model as the image segmentation model. In response to determining that the terminal condition is not satisfied, a new iteration of the iteration process may be initiated by determining the intermediate image of the current iteration as the image to be modified of the new iteration.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 10:
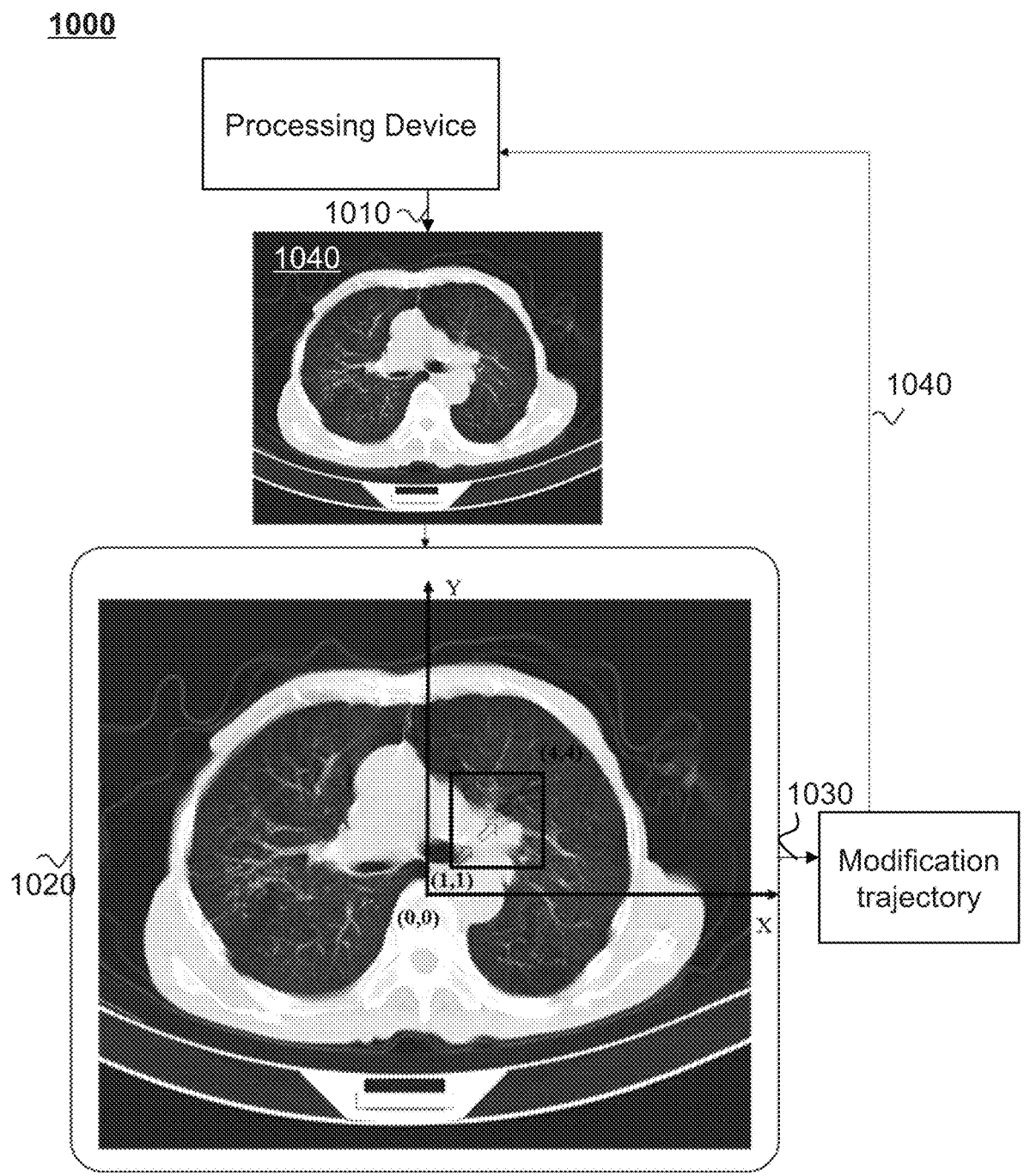
FIG. 10 is a flowchart illustrating an exemplary process for obtaining a modification trajectory according to some embodiments of the present disclosure.

FIG. 10 is a flowchart illustrating an exemplary process 1000 for obtaining a modification trajectory according to some embodiments of the present disclosure.

In 1010, the image to be modified (e.g., as illustrated in FIG. 9C) may be displayed. In some embodiments, a processing device may send the image to be modified to a display device (e.g., a display device 1500 in FIG. 15). For example, the image 1040 to be modified may be displayed through the processing device 110 (e.g., a display device 1500 implemented in the processing device 110). The processor 210 may send the image to be modified to the display device 1500 implemented in the processing device 100. As another example, the image 1040 to be modified may be sent from the processing device 110 to the terminal 130, and be displayed through the terminal 130 (e.g., the display 320 implemented based on the display device 1500).

In 1020, one or more input instructions configured to perform at least one modification on the image to be modified may be obtained.

In some embodiments, an input instruction may be an operation instruction inputted by a user in a process of modifying the image to be modified. The modification of the image to be modified from the user may be realized by one or more input instructions.

In some embodiments, the input instruction may be obtained by touching a screen, a mouse clicking, a keyboard inputting, a voice inputting, or the like, or any combination thereof. The touching a screen may be an operation that triggers the screen of a display device. The mouse clicking may be an operation controlling mouse to click on a location of a display screen. The keyboard inputting may be an operation of inputting text information through the keyboard. The voice inputting may be an operation of inputting voice information through a voice input device (e.g., a microphone).

In some embodiments, the input instruction may include a scaling instruction, a clipping instruction, a moving instruction, a deleting instruction, an adding instruction, or the like, or any combination thereof.

In some embodiments, the display device may receive a scaling instruction inputted by a user, and may display a smaller or larger image to be modified based on the scaling instruction.

In some embodiments, the display device may receive a clipping instruction inputted by a user, and may display a cropped image to be modified on the screen based on the clipping instruction.

In some embodiments, the display device may receive a moving instruction inputted by a user, and may display a moved image to be modified on the screen based on the moving instruction.

The display device may display the image to be segmented on the screen based on other received instructions from the user, and the present disclosure may not be limited.

In some embodiments, the modification trajectory of the image to be modified may include at least one of a location of the at least one modification on the image to be modified, a type of the at least one modification, or a modification time of the at least one modification.

The location of the at least one modification on the image to be modified may include coordinates of pixels corresponding to an incorrectly identified region that the user is corrected in the image to be modified. The origin of a coordinate system corresponding to the image to be modified may be a point in the image to be modified. For example, a center point of the image to be modified.

A type of modification may refer to a way to perform the modification by the user. In some embodiments, the type of modification may include outlining (such as a boxing, clicking) an error area, erasing an error boundary, outlining a boundary, or the like, or any combination thereof. Outlining the error area may refer to that a user may mark a region that actually belongs to the background region but is deemed as the target region in the image to be modified, or a region that actually belongs to the target region but is deemed as the background region in the image to be modified. Erasing the error boundary may refer to that the user may delete a boundary in the image to be modified. Outlining a boundary may refer to that the user may draw a new boundary in the image to be modified.

The time of modification may refer to a start time and/or an end time of the operation of performing a modification by the user.

In step 1030, the modification trajectory of the at least one modification may be obtained based on the one or more input instructions.

In some embodiments, the display device may obtain video data generated by recording the modification process of the at least one modification that is performed, through the display device, on the image to be modified. The display device may obtain the modification trajectory of the at least one modification based on the video data.

In some embodiments, the modification trajectory of the image to be modified may be obtained by recording.

In some embodiments, the display device may be recorded to obtain the modification trajectory of the user for the image to be modified on the display device. The modification of the user to the image to be modified on the screen may be recorded, and video data may be generated. When the input instruction is detected, the modification information corresponding to a trigger may be determined. According to the video data and modification information, the modification trajectory may be obtained.

The video data may be dynamic video recorded by electrical signals, and include a plurality of successive still temporal frames. In some embodiments, the video data that the user modifies the image to be modified may include at least one of a location of the at least one modification on the processed image, a type of the at least one modification, or a modification time of the at least one modification.

In some embodiments, the format of video data may include Digital Video Disc (DVD), Flash Video (FLV), Motion Picture Experts Group (MPEG), AVI (Audio Video Interleaved), Video Home System (VHS), or Real Media file format (RM), or the like, or any combination thereof.

In some embodiments, the modification trajectory of the user for the image to be modified may be obtained by a camera, mouse tracking software, recording software, or the like, which may not be limited in the present disclosure.

In some embodiments, in a process that the user inputs an input instruction for modifying the image to be modified, the display device may record the screen of the display device and generate the video data based on the input instruction.

In some embodiments, the video data may be generated by the screen recorded by a recording software of the display device when the input instructions are detected.

In some embodiments, the display device may obtain one or more input instructions configured to perform the at least one modification on the image to be modified. The display device may obtain the modification trajectory of the at least one modification based on the one or more input instructions.

Modification information corresponding to an input instruction may include information triggered by the input instruction and related to the modification trajectory. It should be understood that the input instruction may correspond to all or a part of video data. In some embodiments, corresponded to the position coordinate, the type of modification, and time of modification of the image to be modified in the video data, the modification information corresponding to the input instruction may include a coordinate of a triggered position, a type of trigger, and time of trigger.

The coordinate of the triggered position may be a position coordinate where the user triggers a screen of the display device. The origin of the position coordinate system corresponding to the position coordinate of the screen may be a preset point in the screen. For example, a center point of the screen.

The coordinate of the triggered position may have a corresponding relationship to the position coordinate modified on the image to be segmented. The image to be modified displayed on the screen of the display device may be a narrowed or widened image, or a clipped image, or a moved image. In some embodiments, the position coordinates of the user modified on the image to be segmented may be obtained based on the coordinate of the triggered position of the user on the screen by the scaling magnification of the screen and the image to be modified, a relationship between an origin of position coordinate system of the screen and an origin of position coordinate system of the image to be modified.

For example, the screen of the display device may reduce the length and width of the image to be modified by two times, the origin of position coordinate system of the screen may coincide with the origin of position coordinate system the image to be modified, and a coordinate of triggered position that is triggered first by the user on the screen may be (20, 30), thus the position coordinates of start position modified by the user on the image to be modified may be (40, 60).

The type of trigger may refer to the way that the user triggers the screen. In some embodiments, the type of trigger may include, but is not limited to, clicking, long pressing, dragging, combo, or the like, or any combination thereof.

The type of trigger may be information related to the type of modification. The type of modification may be determined based on one or more types of trigger. For example, based on the long pressing and dragging of the user on the screen, it may be determined that the type of modification of image to be modified may be boxing.

The time of trigger may refer to a start time and/or an end time when the user triggers the screen.

The time of trigger may be information related to the time of modification. It may be understood that according to the time of trigger and the time of modification on a same time axis in the video data, the coordinate of the triggered position, the type of trigger on the screen and the position coordinate of the image to be modified performed on the image to be modified may correspond to each other, and then a corresponding modification trajectory may be obtained based on the video data and modification information.

As shown in FIG. 10, the screen of the display device may enlarge the length and width of the image to be segmented by two times, and the origin of the position coordinate system of the screen may coincide with the origin of the position coordinate system of the image to be modified. In the $30^{th}$ second to the $31^{st}$ second (e.g., the $120^{th}$ image to be modified to the $124^{th}$ image to be modified of the video data) of the video data (taking the video data of displaying four frames per second as an example), the coordinates of the triggered position on the screen may be (1, 1), (2, 2), (3, 3) and (4, 4), respectively. The type of trigger may be dragging. The modification trajectory may be an area boxed with diagonal coordinates of (0.5, 0.5) and (2, 2) in the image to be segmented, which may be obtained in the 30th second to the 31st second of the video data.

In 1030, the display device may send the modification trajectory to the processing device.

In some embodiments, the processing device and the display device may be located at a same device. The device may perform operations including: displaying an image to be modified in a screen for the user, and obtaining the modification trajectory of the user for the image to be modified.

In some embodiments, the modification process of the user may include a false operation and/or a revocation operation, and a corresponding modification trajectory may include false or unnecessary information.

In some embodiments, the modification trajectory including a false operation and/or a revocation operation may also be used as a training sample.

In some embodiments, a modification trajectory after deleting a false operation and/or a revocation operation may be used as a training sample. In some embodiments, it may be possible to delete a first frame including a false operation and/or a revocation operation by the user, and delete modification trajectory corresponding to the time of modification. In some embodiments, the modification trajectory corresponding to a false operation and/or a revocation operation may be automatically screened and deleted by the processing device 110 from the modification trajectory.

In some embodiments, the process 1000 may be performed while the training process 900-1, 900-2, or 900-3 is being performed. In some embodiments, the process 1000 may be performed in advance. For example, the training process relating to at least one of the process 900-1, the process 900-2, and the process 900-3 may be applied to operation 430 for updating the image segmentation model used in the process 400. When the user performs one or more modifications, the corresponding modification trajectory may be acquired synchronously (e.g., through screen recoding and/or detecting modification instructions). In this way, before the operation 430 for updating the image segmentation model is performed, the modification trajectory is obtained, that is, the modification trajectory may be acquired in advance.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the process 1000 may also be performed by an external device communicating with the image segmentation system 100.

Figure 11:
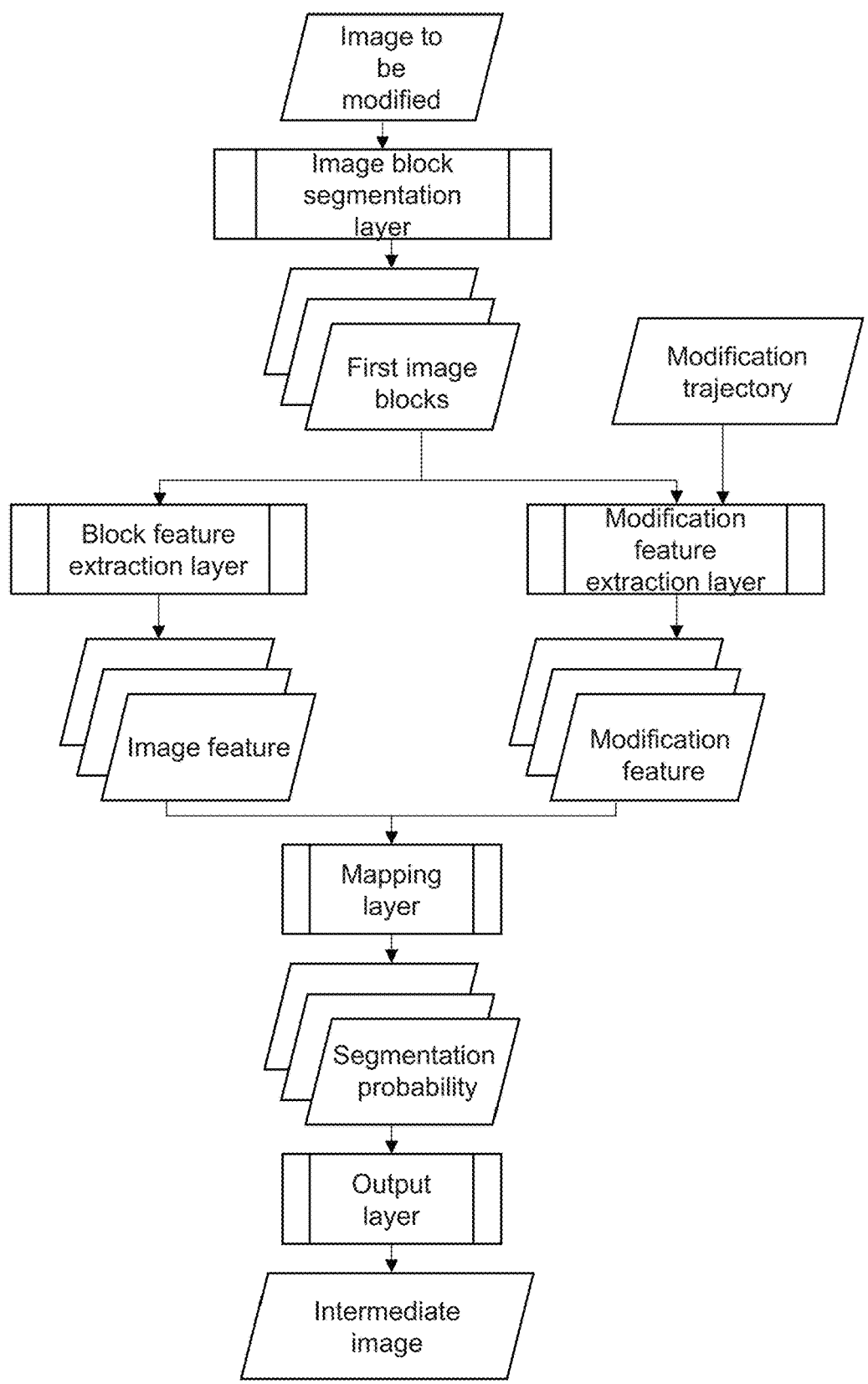
FIG. 11 is a flowchart illustrating an exemplary process for outputting an intermediate image by an intermediate model according to some embodiments of the present disclosure.

FIG. 11 is a flowchart illustrating an exemplary process 1100 for outputting an intermediate image by an intermediate model according to some embodiments of the present disclosure.

In the embodiment of FIG. 11, the intermediate model may be a neural network model. The intermediate model may include a plurality of layers each of which includes a plurality of neurons, and each neuron may perform a matrix transformation on data. Parameters used by the matrix may be obtained by training. The output data of neurons may be processed by an activation function, and then may enter a next layer. The activation function may include a common ReLU, Sigmoid, or Dropout, or the like.

As shown in FIG. 11, the process 1100 may include the following operations.

An image to be modified may be input into an image block segmentation layer of the intermediate model. The image block segmentation layer may divide the image to be modified into a plurality of first image blocks.

In some embodiments, the input of the image block segmentation layer may be the image to be modified, and the output of the image block segmentation layer may be the plurality of the first image blocks of the image to be modified. A first image block of the image to be modified may be a part (e.g., a region of 3*3 pixels) of the image to be modified.

In some embodiments, the image block segmentation layer may segment the plurality of the first image blocks from the image to be modified by a multi-scale sliding-window, a selective search, a neural network, or other ways.

For example, the image to be modified may be a still image of 200×200 pixels. 190×190 first image blocks may be obtained from the image to be modified by a sliding-window of 10×10 pixels. A scale, a step size, and/or number of segmentation of the sliding window of the image block segmentation layer may be a preset parameter.

The plurality of the first image blocks may be input into a block feature extraction layer of the intermediate model to extract image features of the plurality of the first image blocks.

In some embodiments, the input of the block feature extraction layer may be the plurality of the first image blocks, and the output of the block feature extraction layer may be image features of the plurality of the first image blocks.

An image feature of an image block may refer to a feature vector of the image block. In some embodiments, an image feature may include a Harr feature, a Histogram of Oriented Gradients (HOG) feature, a Local Binary Patterns (LBP) feature, an Edgelet feature, a Color-Self Similarity (CSS) feature, an Integral Channel feature, and a Census Transform Histogram (CENTRIST) feature, or the like.

The block feature extraction layer may obtain the feature vector of each first image block. The block feature extraction layer may obtain a plurality of image features of a first image block, and then fuse the plurality of image features to obtain the feature vector of the first image block.

In some embodiments, the block feature extraction layer may be a Convolutional Neural Networks (CNN) model, a Recurrent Neural Network (RNN) model or a Long Short Term Memory Network (LSTM) model, or any combination thereof.

The plurality of first image blocks and the modification trajectory of the image to be modified may be input into a modification feature extraction layer of the intermediate model to extract a modification feature of the plurality of the first image blocks based on the modification trajectory.

In some embodiments, the input of the modification feature extraction layer may be the modification trajectory and the plurality of first image blocks, and the output of the modification feature extraction layer may be the modification features of the plurality of the first image blocks.

In some embodiments, the user may not modify all areas in the image to be modified, that is, the modification trajectory may not correspond to all of the plurality of first image blocks. In some embodiments, during a process that the processed image is generated using the preliminary segmentation model, in which there is no modification trajectory, the operation for extracting the modification features may be omitted.

In some embodiments, the modification feature extraction layer may obtain the modification trajectory corresponding to a first image block based on the position coordinate modified on the image to be modified, and then extract the modification feature of the first image block based on the modification trajectory.

The modification feature may be a vector corresponding to the modification trajectory on a first image block. In some embodiments, each element of the modification feature may correspond to the position coordinate, type of modification, and time of modification included in the modification trajectory. For example, a modification may be performed on a first image block and the medication trajectory corresponding to the first image block may include the following information. In the $30^{th}$ second to $31^{st}$ second of the video data, boxing (using "1" to represent a type of modification "boxing") an area of the first image block with diagonal coordinates of (0.5, 0.5) and (2, 2), and the modification feature of the first image block may be represented as (30, 31, 1, 0.5, 0.5, 2, 2).

In some embodiments, the modification feature extraction layer may be a Convolutional Neural Network (CNN) model, a Recurrent Neural Network (RNN) model or a Long Short Term Memory Network (LSTM) model, or any combination thereof.

The image features and the modification features of the plurality of the first image blocks may be input into a mapping layer of the intermediate model to determine a segmentation probability for each of the plurality of first image blocks.

In some embodiments, the input of the mapping layer may be the image features and the modification features of the plurality of the first image blocks, and the output of the mapping layer may be a plurality of segmentation probabilities corresponding to the plurality of the first image blocks.

In some embodiments, the mapping layer may fuse the image feature and the modification feature of each first image block into a vector, and then map the vector to a segmentation probability.

In some embodiments, the mapping layer may include a Support Vector Machine, a Sigmoid function, a Naive Bayes classification model, decision tree model, random forest model, or the like, or any combination thereof.

An output layer may output the intermediate image based on the plurality of segmentation probabilities corresponding to the plurality of the first image blocks.

In some embodiments, the input of the output layer may be the plurality of segmentation probabilities of the plurality of the first image blocks, and the output of the output layer may be the intermediate image.

In some embodiments, the output layer may determine whether a segmentation probability corresponding to a first image block is larger than a probability threshold. In response to determining that the segmentation probability corresponding to the first image block is larger than the probability threshold, the output layer may determine that the first image block belongs to the target region. In response to determining that the segmentation probability corresponding to the first image block is not larger than the probability threshold, the output layer may determine that the first image block belongs to the background region. For example, the probability threshold is 0.5, and the segmentation probability corresponding to a first image block is 0.8 that is larger than 0.5, the output layer may determine that the first image block belongs to the target region.

In some embodiments, the output layer may determine that which target sub-region a first image block belongs to based on a maximum value among the segmentation probabilities of the first image block. For example, the segmentation probabilities that a first image block belongs to a first target sub-region, a second target sub-region, and the background region may be 0.6, 0.8, and 0.4, respectively, so the first image block may belong to the second target sub-region.

The output layer may distinguish the first image blocks, and output the intermediate image with an identification of the target region. In some embodiments, the output layer may outline a boundary between the first image blocks belonging to the target region and the first image blocks belong to the background region in the image to be modified, and output the intermediate image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the image segmentation model used in the process 400 in FIG. 4 may be obtained using the training process related to the process 900-1, the process 900-2, the process 900-3, the process 1000, and the process 1100.

In some embodiments, as illustrated in the process 400 in FIG. 4, after the target image is generated based on the process 400, the image segmentation model used in the process 400 may be updated based on the generated target image. The operation 430 for updating the image segmentation model based on the target image may be performed based on the training process related to the process 900-1, the process 900-2, the process 900-3, the process 1000, and the process 1100.

Merely by way of example, a target image of an image to be segmented may be generated using an image segmentation model by performing a first iteration process based on the process 400. The target region may include an identification of a target region of the image to be segmented. The image segmentation model may be updated based on the target image by performing a second iteration process based on at least one of the process 900-1, the process 900-2, the process 900-3, the process 1000, and the process 1100. In this case, the image segmentation model used to generate the target image may correspond to the preliminary segmentation model of the process 900-1.

A training set may be obtained. The training set may include a plurality of training data groups and the target image. A training data group may correspond to an iteration of the first iteration process. For example, a training data group may include an image to be modified and a modification trajectory of one or more modifications performed on the image to be modified in an iteration of the first iteration process. The second iteration process may be performed based on the training set to update the image segmentation model (i.e., the preliminary segmentation model).

A training data group may be input into an intermediate model, and the intermediate model may output an intermediate image based on the training data group. The intermediate model may be the preliminary segmentation model in the first iteration of the second iteration process, or an updated model generated in the previous iteration. A loss function may be determined based on the intermediate image and the target image. The intermediate model may be updated based on the loss function. A determination relating to whether a terminal condition is satisfied may be obtained. In response to determining that the terminal condition is satisfied, the second iteration process may be terminated by outputting the updated model in the current iteration. In response to determining that the terminal condition is not satisfied, a new iteration of the second iteration process may be initiated by inputting another training data group into the updated model.

In some embodiments, in an iteration of the second iteration process, a training data group corresponding to an iteration of the first iteration process may be input into the intermediate model. For example, in the first iteration of the second iteration process, a training data group corresponding to the first iteration of the first iteration process may be input into the intermediate model. As another example, in the second iteration of the second iteration process, a training data group corresponding to the second iteration of the first iteration process may be input into the intermediate model.

FIG. 12 is a schematic block diagram illustrating an exemplary processing device 1200 according to some embodiments of the present disclosure. In some embodiments, the processing device 110 may be implemented based on the processing device 1200. The processing device 1200 may include a pre-segmentation module 1210, a target image generation module 1220, and an updating module 1230. In some embodiments, the target image generation module 1220 may include a modification obtaining unit 1222, an image segmentation unit 1224, and an output unit 1226.

The pre-segmentation module 1210 may obtain a first image associated with an image to be segmented.

The target image generation module 1220 may perform an iteration process for obtaining a target image. The modification obtaining unit 1222 may obtain an image to be modified. The modification obtaining unit 1222 may obtain one or more modifications performed, by one or more users, on the image to be modified. The image segmentation unit 1224 may generate a second image by inputting the image to be segmented, the image to be modified, and the one or more modifications into the image segmentation model. The image segmentation unit 1224 may determine whether the second image satisfies a first condition. In response to determining that the second image does not satisfy the first condition, the image segmentation unit 1224 may initiate a new iteration of the iteration process by determining the second image generated in the current iteration as the image to be modified of the new iteration. In response to determining that the second image satisfies the first condition, the output unit 1226 may terminate the iteration process by determining the second image in the current iteration as the target image.

The updating module 1230 may update the image segmentation model based on the target image.

The modules in the processing device 1200 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 1200 may further include a storage module (not shown in FIG. 12). The storage module may be configured to store data generated during any process performed by any component of in the processing device 1200. As another example, each of the components of the processing device 1200 may include a storage device. Additionally or alternatively, the components of the processing device 1200 may share a common storage device.

FIG. 13 is a schematic block diagram illustrating an exemplary terminal 1300 according to some embodiments of the present disclosure. In some embodiments, the terminal 130 may be implemented based on the terminal 1300. The terminal 1300 may include an image receiving module 1310 and an iteration module 1320. In some embodiments, the iteration module 1320 may include a modification transmission unit 1322, an image receiving unit 1324, and a determination unit 1326.

The image receiving module 1310 may receive an image to be modified associated with an image to be segmented from the processing device 110.

The iteration module 1320 may obtain one or more modifications performed, by one or more users, on the image to be modified. The modification transmission unit 1322 may send the one or more modifications to the processing device 110. The image receiving unit 1324 may receive a segmented image (e.g., a second image) from the processing device 110. The determination unit 1326 may determine whether the second image satisfies a first condition. The determination unit 1326 may send the determination on whether the second image satisfies the first condition to the processing device 110.

The modules in the terminal 1300 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the terminal 1300 may further include a storage module (not shown in FIG. 13). The storage module may be configured to store data generated during any process performed by any component of in the terminal 1300. As another example, each of the components of the terminal 1300 may include a storage device. Additionally or alternatively, the components of the terminal 1300 may share a common storage device.

Figure 14:
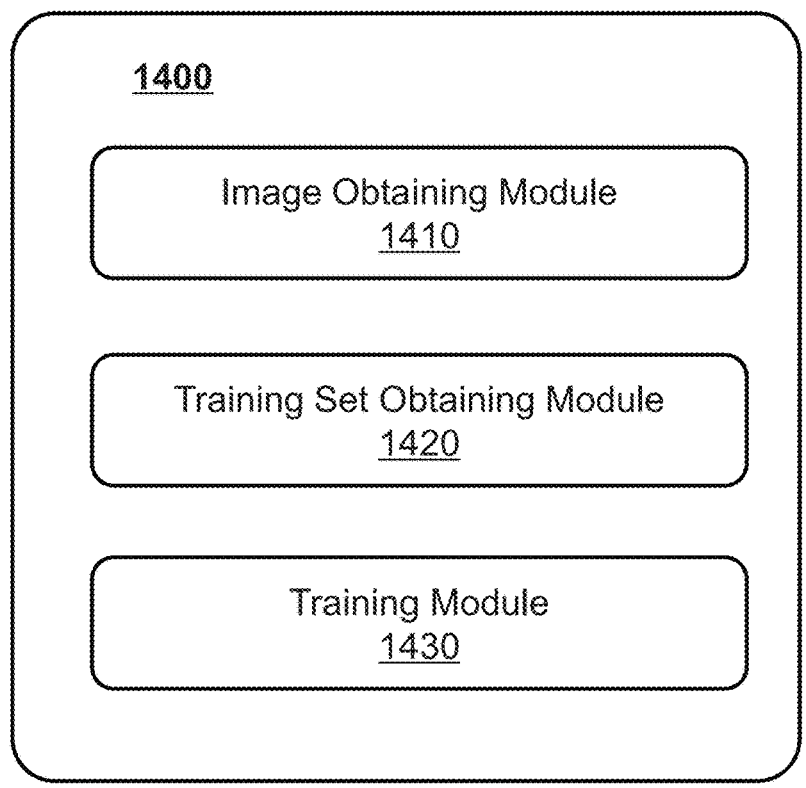
FIG. 14 is a schematic block diagram illustrating an exemplary training device according to some embodiments of the present disclosure.

FIG. 14 is a schematic block diagram illustrating an exemplary training device 1400 according to some embodiments of the present disclosure. In some embodiments, the training device 1400 may be implemented in the system 100 (e.g., the processing device 110) or an external device communicating with the system 100. The training device

1400 may include an image obtaining module 1410, a training set obtaining module 1420, and a training module 1430.

The image obtaining module 1410 may obtain an image to be segmented including a target region. The image obtaining module 1410 may obtain a preliminary segmentation model. The image obtaining module 1410 may generate a processed image by inputting the image to be segmented into the preliminary segmentation model.

The training set obtaining module may obtain a training set including the processed image, a modification trajectory of at least one modification performed on the processed image, and a target image including an identification of the target region.

The training module 1430 may obtain an image segmentation model by training, based on the training set, the preliminary segmentation model.

The modules in the training device 1400 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the training device 1400 may further include a storage module (not shown in FIG. 14). The storage module may be configured to store data generated during any process performed by any component of in the training device 1400. As another example, each of the components of the training device 1400 may include a storage device. Additionally or alternatively, the components of the training device 1400 may share a common storage device.

Figure 15:
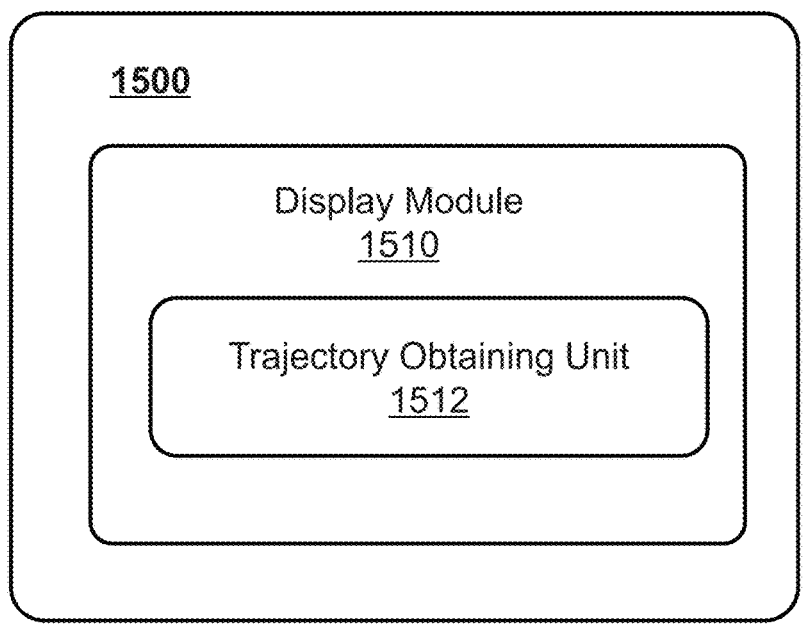
FIG. 15 is a schematic block diagram illustrating an exemplary display device according to some embodiments of the present disclosure.

FIG. 15 is a schematic block diagram illustrating an exemplary display device 1500 according to some embodiments of the present disclosure. In some embodiments, the display device 1500 may be implemented in the terminal 130 (e.g., the display 320). The display device 1500 may include a display module 1510 configured to display the image to be modified. A user may modify the image to be modified through the display module 1510. The display module 1510 may include a trajectory obtaining unit 1512. The trajectory obtaining unit 1512 may be configured to obtain video data generated by recording the modification process of at least one modification that is performed, through the display device 1500, on the image to be modified, and obtain the modification trajectory of the at least one modification based on the video data. The trajectory obtaining unit 1512 may also be configured to obtain one or more input instructions configured to perform at least one modification on the image to be modified, and obtain the modification trajectory of the at least one modification based on the one or more input instructions.

The modules in the display device 1500 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the display device 1500 may further include a storage module (not shown in FIG. 15). The storage module may be configured to store data generated during any process performed by any component of in the display device 1500. As another example, each of the components of the display device 1500 may include a storage device. Additionally or alternatively, the components of the display device 1500 may share a common storage device.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Meanwhile, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Moreover, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block," "module," "engine," "unit," "element" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Moreover, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

In some embodiments, the numbers expressing quantities or properties used to describe and claim certain embodiments of the disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the disclosure are approximations, the numerical values set forth in the specific examples are reported as precisely as practicable.

Each of the patents, patent disclosures, publications of patent applications, and other material, such as articles, books, disclosures, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

Finally, it is to be understood that the embodiments of the disclosure disclosed herein are illustrative of the principles of the embodiments of the disclosure. Other modifications that may be employed may be within the scope of the disclosure. Thus, by way of example, but not of limitation, alternative configurations of the embodiments of the disclosure may be utilized in accordance with the teachings herein. Accordingly, embodiments of the present application are not limited to that precisely as shown and describe.

What is claimed is:

1. A method for image segmentation implemented on a machine including one or more storage devices and one or more processing devices, comprising:
    obtaining an image to be segmented including a target region;
    generating a segmented image by processing the image to be segmented through a pre-segmentation model;
    obtaining one or more modifications performed, by one or more users, on the segmented image;
    generating an output image by inputting the image to be segmented, the segmented image, and the one or more modifications into an image segmentation model; and
    generating a target image based on the output image, the target image including an identification of the target region;
    wherein the image segmentation model is provided by:
    obtaining a sample image to be segmented;
    obtaining a preliminary segmentation model;
    generating a processed image by inputting the sample image to be segmented into the preliminary segmentation model;
    obtaining a training set including the processed image, a modification trajectory of at least one modification performed on the processed image, and a sample target image including an identification of a sample region in the sample image to be segmented, the processed image and the modification trajectory being used as a training sample, the sample target image being used as a label of the training sample; and
    obtaining the image segmentation model by training, based on the training set the preliminary segmentation model.

2. A system for image segmentation, comprising:
    at least one storage device including a set of instructions; and
    at least one processor in communication with the at least one storage device, wherein when executing the set of instructions, the at least one processor is directed to cause the system to perform operations including:
    obtaining an image to be segmented including a target region;
    generating a segmented image by processing the image to be segmented through a pre-segmentation model;
    obtaining one or more modifications performed, by one or more users, on the segmented image;
    generating an output image by inputting the image to be segmented, the segmented image, and the one or more modifications into an image segmentation model; and
    generating a target image based on the output image, the target image including an identification of the target region;
    wherein the image segmentation model is provided by:
    obtaining a sample image to be segmented;
    obtaining a preliminary segmentation model;
    generating a processed image by inputting the sample image to be segmented into the preliminary segmentation model;
    obtaining a training set including the processed image, a modification trajectory of at least one modification performed on the processed image, and a sample target image including an identification of a sample region in the sample image to be segmented, the processed image and the modification trajectory being used as a training sample, the sample target image being used as a label of the training sample; and
    obtaining the image segmentation model by training, based on the training set, the preliminary segmentation model.

3. The system of claim 2, wherein the at least one processor is directed to cause the system to perform operations including:
    determining whether the segmented image satisfies a second condition; wherein the second condition refers to a condition that the segmented image satisfies a user's segmentation requirement;
    in response to determining that the segmented image satisfies the second condition, determining the segmented image as the target image; or
    in response to determining that the segmented image does not satisfy the second condition, generating the output image based on the segmented image.

4. The system of claim 2, wherein generating the target image based on the output image includes:
    sending the output image to a terminal;
    receiving, from the terminal, a determination associated with whether the output image satisfies a first condition; wherein the first condition refers to a condition that the output image satisfies a user's segmentation requirement;
    in response to determining that the output image satisfies the first condition, determining the output image as the target image.

5. The system of claim 2, wherein obtaining the one or more modifications performed, by the one or more users, on the segmented image includes:
    sending the segmented image to a terminal; and
    receiving, from the terminal, the one or more modifications performed, by the one or more users, on the segmented image.

6. The system of claim 2, wherein the at least one processor is directed to cause the system to perform the operations including:
    updating the image segmentation model based on the target image.

7. The system of claim 6, wherein updating the image segmentation model based on the target image includes:
    obtaining an updating sample set including the image to be segmented, the segmented image, and the target image; and
    updating one or more parameters of the image segmentation model based on the updating sample set.

8. The system of claim 7, wherein the updating sample set includes at least one modification performed on the segmented image.

9. The system of claim 8, wherein the one or more parameters of the image segmentation model indicate an image modification characteristic of the one or more users, and the image modification characteristic reflects segmentation habits and segmentation requirements of the one or more users.

10. The system of claim 6, wherein updating the image segmentation model based on the target image includes:
    obtaining a modification trajectory of at least one modification performed on the segmented image;
    obtaining a training set including the modification trajectory, the segmented image, and the target image; and
    updating the image segmentation model based on the training set.

11. The system of claim 10, wherein the modification trajectory includes at least one of
    a location of the at least one modification on the segmented image,
    a type of the at least one modification, or
    a modification time of the at least one modification.

12. The system of claim 10, wherein the modification trajectory includes a record of a modification process of performing the at least one modification on the segmented image in a period of time.

13. The system of claim 12, wherein obtaining the modification trajectory of the at least one modification performed on the segmented image includes:
    obtaining video data generated by recording the modification process of the at least one modification that is performed, through a display device, on the segmented image; and
    obtaining the modification trajectory of the at least one modification based on the video data.

14. The system of claim 12, wherein obtaining the modification trajectory of the at least one modification performed on the segmented image includes:
    obtaining one or more input instructions configured to perform the at least one modification on the segmented image; and
    obtaining the modification trajectory of the at least one modification based on the one or more input instructions.

15. The system of claim 10, wherein updating the image segmentation model based on the training set includes:
    generating an intermediate image by inputting the segmented image and the modification trajectory into the image segmentation model;
    determining a loss function based on the intermediate image and the target image; and
    updating the image segmentation model based on the loss function.

16. The system of claim 2, wherein the at least one processor is further directed to cause the system to perform operations including:
  performing an iteration process for obtaining the target image, wherein the iteration process includes a plurality of iterations each of which includes:
    obtaining an image to be modified, the image to be modified including the segmented image in a first iteration of the plurality of iterations of the iteration process, or an image generated by the image segmentation model in a previous iteration;
    obtaining one or more modifications performed, by the one or more users, on the image to be modified;
    generating a second image by inputting the image to be segmented, the image to be modified, and the one or more modifications into the image segmentation model;
    determining whether the second image satisfies a first condition, the first condition referring to a condition that the second image satisfies a user's segmentation requirement;
    in response to determining that the second image does not satisfy the first condition, initiating a new iteration of the iteration process by determining the second image generated in a current iteration as the image to be modified of the new iteration; and
    in response to determining that the second image satisfies the first condition, determining the second image as the target image.

17. The system of claim 15, wherein determining a loss function based on the intermediate image and the target image includes:
  determining a segmentation probability of each of a plurality of first image blocks of the intermediate image, the segmentation probability indicating a probability that the first image block belongs to the target region;
  obtaining a segmentation type of each of a plurality of second image blocks of the target image, each of the plurality of second image blocks corresponding to one of the plurality of first image blocks, the segmentation type indicating whether the second image block belongs to the target region; and
  determining the loss function based on the segmentation probabilities and the segmentation types.

18. The system of claim 2, wherein the image segmentation model includes an image block segmentation layer, a feature extraction layer, a mapping layer, and an output layer;
  generating the output image by inputting the image to be segmented, the segmented image, and the one or more modifications into the image segmentation model includes:
    segmenting, by the image block segmentation layer, a plurality of first image blocks from the image to be segmented and a plurality of second image blocks from the segmented image, each of the plurality of second image blocks corresponding to one of the plurality of first image blocks;
    extracting, by the feature extraction layer, one or more image feature vectors of the plurality of first image blocks;
    extracting, by the feature extraction layer, one or more identification feature vectors of the plurality of second image blocks;
    extracting, by the feature extraction layer, one or more modification feature vectors from the one or more modifications;
    determining, by the mapping layer, a plurality of segmentation probabilities each of which corresponds to one of the plurality of first image blocks based on the one or more image feature vectors, the one or more identification feature vectors, and the one or more modification feature vectors;
    generating, by the output layer based on the plurality of segmentation probabilities, the output image in which a boundary configured to identify the target region and a background region is delineated.

19. The method of claim 1, wherein determining the target image further includes:
  performing an iteration process for obtaining the target image, wherein the iteration process includes a plurality of iterations each of which includes:
    obtaining an image to be modified, the image to be modified including the segmented image in a first iteration of the plurality of iterations of the iteration process, or an image generated by the image segmentation model in a previous iteration;
    obtaining one or more modifications performed, by the one or more users, on the image to be modified;
    generating a second image by inputting the image to be segmented, the image to be modified, and the one or more modifications into the image segmentation model;
    determining whether the second image satisfies a first condition, the first condition referring to a condition that the second image satisfies a user's segmentation requirement;
    in response to determining that the second image does not satisfy the first condition, initiating a new iteration of the iteration process by determining the second image generated in a current iteration as the image to be modified of the new iteration; and
    in response to determining that the second image satisfies the first condition, determining the second image as the target image.

20. A non-transitory computer readable medium, comprising at least one set of instructions, wherein when executed by one or more processors of a computing device, the at least one set of instructions causes the computing device to perform a method, the method comprising:
  obtaining an image to be segmented including a target region;
  generating a segmented image by processing the image to be segmented through a pre-segmentation model;
  obtaining one or more modifications performed, by one or more users, on the segmented image;
  generating an output image by inputting the image to be segmented, the segmented image, and the one or more modifications into an image segmentation model; and
  generating a target image based on the output image, the target image including an identification of the target region;
  wherein the image segmentation model is provided by:
  obtaining a sample image to be segmented;
  obtaining a preliminary segmentation model;
  generating a processed image by inputting the sample image to be segmented into the preliminary segmentation model;
  obtaining a training set including the processed image, a modification trajectory of at least one modification performed on the processed image, and a sample target image including an identification of a sample region in the sample image to be segmented, the processed image and the modification trajectory being used as a training sample, the sample target image being used as a label of the training sample; and obtaining the image segmentation model by training, based on the training set, the preliminary segmentation model.

\* \* \* \* \*